(12) United States Patent
Liang et al.

(10) Patent No.: US 9,705,641 B2
(45) Date of Patent: Jul. 11, 2017

(54) METHOD AND DEVICE FOR SENDING ANSWER INFORMATION

(71) Applicant: ZTE Corporation, Shenzhen (CN)

(72) Inventors: Chunli Liang, Shenzhen (CN); Bo Dai, Shenzhen (CN); Shuqiang Xia, Shenzhen (CN); Weiwei Yang, Shenzhen (CN); Bin Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 109 days.

(21) Appl. No.: 14/436,136

(22) PCT Filed: Oct. 14, 2013

(86) PCT No.: PCT/CN2013/085182
§ 371 (c)(1),
(2) Date: May 21, 2015

(87) PCT Pub. No.: WO2014/059910
PCT Pub. Date: Apr. 24, 2014

(65) Prior Publication Data
US 2015/0295681 A1 Oct. 15, 2015

(30) Foreign Application Priority Data
Oct. 17, 2012 (CN) .......................... 2012 1 0395054

(51) Int. Cl.
*H04L 1/18* (2006.01)
*H04J 4/00* (2006.01)
(Continued)

(52) U.S. Cl.
CPC .............. *H04L 1/1812* (2013.01); *H04J 4/00* (2013.01); *H04L 1/18* (2013.01); *H04L 1/1848* (2013.01);
(Continued)

(58) Field of Classification Search
CPC ....... H04L 1/18; H04L 1/1812; H04L 1/1854; H04L 1/1861; H04L 5/0055; H04W 72/0446
See application file for complete search history.

(56) References Cited

U.S. PATENT DOCUMENTS

| | | | |
|---|---|---|---|
| 2013/0114472 A1* | 5/2013 | Tamaki | H04L 1/1854 370/280 |
| 2013/0343239 A1* | 12/2013 | Damnjanovic | H04L 5/001 370/280 |
| 2014/0161002 A1* | 6/2014 | Gauvreau | H04L 1/1893 370/280 |

FOREIGN PATENT DOCUMENTS

| | | |
|---|---|---|
| CN | 102142941 A | 8/2011 |
| CN | 102611666 B | 10/2011 |

(Continued)

OTHER PUBLICATIONS

PCT International Search Report for PCT Application No. PCT/CN2013/085182 mailed Jan. 16, 2014 (5 pages).
(Continued)

*Primary Examiner* — Pao Sinkantarakorn
(74) *Attorney, Agent, or Firm* — Eversheds Sutherland (US) LLP

(57) ABSTRACT

Disclosed are a method and device for sending answer information, wherein, when a frequency division duplex (FDD) and a time division duplex (TDD) aggregate, where a TDD cell serves as a primary serving cell and a FDD cell works as a secondary serving cell, a user equipment (UE) groups downlink subframes of the FDD secondary serving cell, and different downlink subframe groups use different hybrid automatic repeat request (HARQ) timing relationships, determines uplink subframes where HARQ-ACK acknowledgment messages corresponding to physical downlink shared channels (PDSCHs) of the downlink subframe
(Continued)

groups are transmitted, and sends the HARQ-ACK messages on the determined uplink subframes.

13 Claims, 7 Drawing Sheets

(51) Int. Cl.
*H04W 72/04* (2009.01)
*H04W 84/04* (2009.01)

(52) U.S. Cl.
CPC ....... *H04L 1/1854* (2013.01); *H04W 72/0446* (2013.01); *H04W 84/042* (2013.01)

(56) References Cited

FOREIGN PATENT DOCUMENTS

| | | |
|---|---|---|
| CN | 102651680 A | 8/2012 |
| WO | 2011/074839 A2 | 6/2011 |
| WO | 2012061257 A1 | 5/2012 |
| WO | 2012109195 A2 | 8/2012 |

OTHER PUBLICATIONS

Supplementary European Search Report for EP Applciation No. 13846956.4 mailed Nov. 20, 2015 (9 pages).

\* cited by examiner

METHOD AND DEVICE FOR SENDING ANSWER INFORMATION

CROSS REFERENCES TO RELATED APPLICATIONS

This application claims the priority benefit of PCT/CN2013/085182 filed on Oct. 14, 2013 and Chinese Application No. 201210395054.3 filed on Oct. 17, 2012. The contents of these applications are hereby incorporated by reference in their entirety.

TECHNICAL FIELD

The present document relates to wireless communication technology, and more particularly, to a method and device for sending answer information.

BACKGROUND

LTE (Long Term Evolution) technology has two duplex modes, namely FDD (Frequency Division Duplex) and TDD (Time Division Duplex). The FDD mode is to make the uplink transmission and downlink reception of a UE (User Equipment) performed in different frequency bands, namely uplink frequency band and downlink frequency band, and the uplink transmission and the downlink reception can occur at the same time. The TDD mode is that the uplink transmission and downlink reception of a UE are performed at different times, and the uplink transmission and the downlink reception cannot occur simultaneously at a time. The LTE spectrum resources are mainly 2500 MHz~2690 MHz, wherein 2500 MHz~2570 MHz is the LTE FDD uplink frequency band, 2620 MHz~2690 MHz is the LTE FDD downlink frequency band, 2570 MHz~2620 MHz is the LTE TDD frequency band, and since the LTE technology has two duplex modes of FDD and TDD, from the duplex mode point of view, the LTE network may be divided into two kinds: a FDD kind and TDD kind, and the LTE FDD system network works in the FDD frequency band, and the TDD system network works in the TDD frequency band.

There are two frame structures corresponding to the above two duplex modes. FIG. 1 is a schematic diagram of a frame structure in the LTE/LTE-A FDD system in the related art, as shown in FIG. 1, a 10 millisecond (ms) radio frame is made up of 20 0.5 ms time slots numbered 0~19, and the time slots 2i and 2i+1 consist into a 1 ms subframe.

FIG. 2 is a schematic diagram of a frame structure in the LTE/LTE-A TDD system in the related art, and as shown in FIG. 2, a 10 ms radio frame consists of two 5 ms half frames, and one half frame comprises five 1 ms subframes, and the subframe i is defined as two 0.5 ms time slots 2i and 2i+1. The uplink and downlink configurations supported in the TDD system are shown in Table 1.

TABLE 1

| Uplink - downlink config- uration | Uplink - downlink switching point cycle | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Wherein, for each subframe in a radio frame, "D" indicates a subframe dedicated to the downlink transmission, and "U" indicates a subframe dedicated to the uplink transmission, "S" indicates a special subframe, and it comprises three parts: a Downlink Pilot Time Slot (referred to as DwPTS), a guard interval (referred to as GP) and an uplink pilot time slot (referred to as UpPTS).

The TDD supports 5 ms and 10 ms uplink and downlink switching cycles. If the downlink to uplink switching point cycle is 5 ms, the special subframe will exist in two half frames; if the downlink to uplink switching point cycle is 10 ms, the special subframe only exists in the first half frame. The subframe 0, the subframe 5 and the DwPTS are always used for the downlink transmission. The UpPTS and the subframe following the special subframe are dedicated to the uplink transmission.

In the LTE system, a hybrid automatic repeat request (HARQ) process refers to: when a transmitting end has data to transmit, the receiving end allocates information such as the frequency domain resources and version information required for transmission to the transmitting end through a downlink signaling. The transmitting end sends data according to this information, and stores the data in its own cache at the same time so as to facilitate retransmitting the data. When the receiving end receives the data, it checks, and if the data are received correctly, an acknowledgment (ACK) is sent to the transmitting end. After receiving the ACK, the transmitting end empties the cache memory used in this transmission, and ends this transmission. If the data are not received correctly, a Negative-acknowledgement (NACK) is sent to the transmitting end, and the packets not correctly received are stored in the cache memory of the receiving end, the transmitting end extracts, after receiving the NACK message, the data from its own cache memory and uses a specific version format to retransmit the data on the corresponding subframe and at the corresponding frequency domain location. After the receiving end receives the retransmitted version, the retransmitted version is combined with the previously not correctly received version, and then the combined version is checked again, and then the above-mentioned process is repeated until the data are correctly received or the number of transmissions exceeds the threshold of the maximum number of transmissions. The above-mentioned ACK or NACK message is collectively referred to as HARQ-ACK message.

In the LTE TDD system, the scheduling timing of a physical downlink shared channel (PDSCH) in the downlink HARQ has the following specification, that is, the scheduling of the downlink HARQ is specified as follows: the UE detecting the PDCCH on the subframe n, and solves the PDSCH of the current subframe according to the PDCCH information.

In the LTE TDD system, the HARQ-ACK message of the PDSCH transmitted in the downlink HARQ has the following timing specification, that is, the downlink HARQ timing relationship is specified as follows: when the UE detects the PDSCH transmission or the PDCCH indicating the downlink SPS release on the subframe n-k, the UE will transmit the corresponding HARQ-ACK message on the uplink subframe n, wherein k belongs to K, and the values of K in different uplink and downlink configurations are shown in Table 2:

TABLE 2

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Compared to the LTE system, the most notable feature of the LTE-A system is that, the LTE-A system introduced the carrier aggregation technology, that is, the bandwidths of the LTE system are aggregated to obtain a greater bandwidth. In a system introduced with the carrier aggregation, a carrier participating the aggregation is called a component carrier (referred to as CC), also referred to as a serving cell. Meanwhile, the concepts of primary component carrier/serving cell (referred to as PCC/PCell) and secondary component carrier/serving cell (referred to as SCC/SCell) are also proposed. A carrier-aggregated system comprises at least one primary serving cell and one secondary serving cell, wherein the primary serving cell is always in the activated state.

In a wireless communication system, due to the existence of out of band power leakiness, spurious emission and other factors, mutual interference always tend to be produced between the communication devices, in particular when the operating frequency bands only have a small or no frequency band interval. In order to avoid out of band power leakiness, spurious emission and other factors from affecting the communication quality, usually a guard band is set between the working frequency bands, so that there is enough available bandwidth between the system working frequency bands. For example, the FDD and TDD frequency bands in the LTE technology are adjacent, and are likely to interfere with each other in the same coverage, if a guard band of 20 MHz or greater is set between the FDD UL and the TDD, as well as between the TDD DL and the TDD, the interference problem can be solved. However, the spectrum resource is a scarce resource and expensive, and relatively low spectrum resource utilization will result in a waste for resources and economy.

2.6 GHz is the primary LTE frequency band deployed by countries, the FDD&TDD hybrid scheme is the mainstream-planning scheme, and the adjacent channel coexistence is the primary problem to be solved. European research on the Guard band based FDD/TDD LTE@2.6 GHz system coexistence scheme will cause a huge waste of spectrum resources if determining to use the GB, which is very negative for the TDD development and international promotion.

The European FDD operators have both the FDD and TDD frequency bands at the same time, and hope to fully use the FDD and TDD frequency bands to obtain higher transmission rate. Chinese TDD operators require the European TDD frequency band to serve the TDD terminals.

In this regard, using the carrier aggregation technology to aggregate the FDD spectrum and the TDD spectrum is a promising technology. When the FDD and the TDD aggregate, and the TDD works as the primary serving cell while the FDD as the secondary serving cell, the first question needing to be faced is how to determine the timing relationship of the uplink and downlink HARQ. If the FDD serving cell participating in the aggregation is also considered as a special TDD serving cell, that is, the FDD downlink frequency band works as the TDD frequency band with a full downlink configuration, while the FDD uplink frequency band works as the TDD frequency band with a full uplink configuration, in this case, the aggregation of the TDD and the FDD can be seen as the aggregation of TDD serving cells having different uplink and downlink configurations.

For the aggregation of serving cells having different uplink and downlink configurations, the timing relationship between the PDSCH of each serving cell participating in the aggregation and the corresponding HARQ-ACK message, that is the downlink HARQ timing relationship, currently has the following conclusions:

1, the HARQ-ACK message of the PDSCH of a serving cell participating in the aggregation can only be transmitted in the primary uplink serving cell;
2, the timing relationship between the PDSCH of the primary serving cell and the corresponding HARQ-ACK message keeps unchanged.

When the TDD and the FDD aggregate and the TDD works as the primary serving cell, for the TDD working as the primary serving cell, the timing relationship between its PDSCH and the corresponding HARQ-ACK message keeps unchanged. However, for a FDD serving cell working as a special TDD serving cell, its corresponding uplink and downlink configuration does not exist, nor does its corresponding downlink PDSCH HARQ timing.

SUMMARY

The embodiment of the present document provides a method and device for sending answer information, to guarantee the downlink throughput when the TDD serving cell and the FDD serving cell aggregate.

A method for sending answer information in accordance with an embodiment of the present document comprises:
  when a frequency division duplex (FDD) and a time division duplex (TDD) aggregate, where a TDD cell works as a primary serving cell and a FDD cell works as a secondary serving cell, a user equipment (UE) grouping downlink subframes of the FDD secondary serving cell, and different downlink subframe groups using different hybrid automatic repeat request (HARQ) timing relationships to determine uplink subframes where HARQ-ACK acknowledgment messages corresponding to physical downlink shared channels (PDSCH) transmitted on respective downlink subframe groups are transmitted, and transmitting the HARQ-ACK messages on the determined uplink subframes.

Preferably, determining the uplink subframes where the HARQ-ACK acknowledgment messages corresponding to the PDSCHs transmitted on respective downlink subframe groups are carried comprises:
  determining the uplink subframes where the HARQ-ACK messages corresponding to the PDSCH transmitted on the downlink subframe groups are carried in accordance with the HARQ timing relationship corresponding to the TDD;

or, sending the HARQ-ACK messages corresponding to the PDSCH of the downlink subframe groups on uplink subframes which have an interval of at least three subframes with the downlink subframes.

Preferably, said grouping the downlink subframes of the FDD secondary serving cell comprises:

grouping the downlink subframes of the FDD secondary serving cell according to an uplink and downlink configuration of the primary serving cell participating in the aggregation.

Preferably, grouping the downlink subframes of the FDD secondary serving cell according to the uplink and downlink configuration of the primary serving cell participating in the aggregation, and determining the uplink subframes where HARQ-ACK acknowledgment messages corresponding to the PDSCH transmitted on respective downlink subframe groups comprise:

when the TDD primary serving cell participating in the aggregation uses any one of uplink and downlink configurations 0-6, the downlink subframes of the FDD secondary serving cell being divided into two groups, wherein:

the downlink subframe contained in group 1 is {2}, the uplink subframe where the HARQ-ACK messages corresponding to the PDSCH of the downlink subframe in the group 1 are transmitted is an uplink subframe which has an interval of at least three subframes with the downlink subframe in the group 1;

the downlink subframes contained in group 2 are {0, 1, 3, 4, 5, 6, 7, 8, 9}, determine uplink subframes where the HARQ-ACK messages corresponding to the PDSCH of the group 2 are carried according to the HARQ timing relationship corresponding to the uplink and downlink configuration 5 of the TDD.

Preferably, grouping the downlink subframes of the FDD secondary serving cell according to the uplink and downlink configuration of the primary serving cell participating in the aggregation, and determining uplink subframes where the HARQ-ACK acknowledgment messages corresponding to the PDSCH transmitted on respective downlink subframe groups comprise:

when the TDD primary serving cell participating in the aggregation uses the uplink and downlink configuration 0, the downlink subframes of the FDD secondary serving cell being divided into three groups, wherein:

the group 1 comprises downlink subframes having the same subframe numbers as the downlink subframes of the primary serving cell, determine uplink subframes where the HARQ-ACK messages corresponding to the PDSCH of the group 1 are carried according to a HARQ timing relationship corresponding to the uplink and downlink configuration 0 of the TDD.

The downlink subframes contained in the group 2 are {3, 8}, determine the uplink subframes where the HARQ-ACK messages corresponding to the PDSCH of the group 2 are carried according to the HARQ timing relationship corresponding to the uplink and downlink configuration 2 of the TDD;

the downlink subframes contained in the group 3 are {2, 4, 7, 8}, the uplink subframes where the HARQ-ACK messages corresponding to the PDSCH of the downlink subframes in the group 3 are carried are uplink subframes which have an interval of at least three subframes with the downlink subframes in the group 3.

Preferably, grouping the downlink subframes of the FDD secondary serving cell according to the uplink and downlink configuration of the primary serving cell participating in the aggregation, and determining the uplink subframes where the HARQ-ACK acknowledgment messages corresponding to the physical downlink shared channel (PDSCH) transmitted on respective downlink subframe groups are carried comprise:

when the TDD primary serving cell participating in the aggregation uses the uplink and downlink configuration 1, downlink subframes of the FDD secondary serving cell being divided into two groups, wherein:

the group 1 comprises downlink subframes with the same subframe numbers as the downlink subframes of the primary serving cell, determine the uplink subframes where the HARQ-ACK messages corresponding to the PDSCH of the group 1 are carried according to the HARQ timing relationship corresponding to the uplink and downlink configuration 1 of the TDD;

the downlink subframes contained in the group 2 are {2, 3, 7, 8}, the uplink subframes where the HARQ-ACK messages corresponding to the PDSCH of the downlink subframes in the group 2 are carried are uplink subframes which have an interval of at least three subframes with the downlink subframes in the group 2.

Preferably, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on the respective downlink subframe groups are carried comprise:

when the TDD primary serving cell participating in the aggregation uses the uplink and downlink configuration 2, the downlink subframes of the FDD secondary serving cell being divided into two groups, wherein:

the group 1 comprises downlink subframes having the same subframe numbers as the downlink subframes of the primary serving cell, determine the uplink subframes where the HARQ-ACK messages corresponding to the PDSCH of the group 1 are carried according to the HARQ timing relationship corresponding to the uplink and downlink configuration 2 of the TDD;

the downlink subframes contained in the group 2 are {2, 7}, the uplink subframes where the HARQ-ACK messages corresponding to the PDSCH of the downlink subframes in the group 2 are uplink subframes which have an interval of at least three subframes with the downlink subframes in the group 2.

Preferably, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprise:

when the TDD primary serving cell participating in the aggregation uses the uplink and downlink configuration 3, the downlink subframes of the FDD secondary serving cell being divided into three groups, wherein:

the group 1 comprises downlink subframes having the same subframe numbers as the downlink subframes of the primary serving cell, determine uplink subframes where the HARQ-ACK messages corresponding to the PDSCH of the group 1 are carried according to the HARQ timing relationship corresponding to the uplink and downlink configuration 3 of the TDD;

the downlink subframes contained in the group 2 are {3, 4}, determine uplink subframes where the HARQ-ACK messages corresponding to the PDSCH of the group 2 are carried according to the HARQ timing relationship corresponding to the uplink and downlink configuration 5 of the TDD;

the downlink subframe contained in the group 3 is {2}, and the uplink subframes where the HARQ-ACK messages corresponding to the PDSCH of the downlink subframe in the group 3 are carried are uplink subframes which has an interval of at least three subframes with the downlink subframe in the group 3.

Preferably, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprise:

when the TDD primary serving cell participating in the aggregation uses the uplink and downlink configuration 3, the downlink subframes of the FDD secondary serving cell being divided into three groups, wherein:

the group 1 comprises a part of the downlink subframes having the same subframe numbers as the downlink subframes of the primary serving cell, determine the uplink subframes where the HARQ-ACK messages corresponding to the PDSCH of the group 1 are carried according to the HARQ timing relationship corresponding to the uplink and downlink configuration 3 of the TDD;

the downlink subframes contained in the group 2 are {3, 4}, determine the uplink subframes where the HARQ-ACK messages corresponding to the PDSCH of the group 2 are carried according to the HARQ timing relationship corresponding to the uplink and downlink configuration 5 of the TDD;

the downlink subframes contained in the group 3 are {2} and the downlink subframes having the same subframe numbers as the downlink frames of the primary serving cell except of the part in the group 1, and the uplink subframes where the HARQ-ACK messages corresponding to the PDSCH of the downlink subframes in the group 3 are carried are uplink subframes which have an interval of at least three subframes with the downlink subframes in the group 3.

Preferably, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe group are carried comprise:

when the TDD primary serving cell participating in the aggregation uses the uplink and downlink configuration 4, the downlink subframes of the FDD secondary serving cell being divided into three groups, wherein:

the group 1 comprises downlink subframes having the same subframe numbers as the downlink subframes of the primary serving cell, determine the uplink subframes where the HARQ-ACK messages corresponding to the PDSCH of the group 1 are carried according to the HARQ timing relationship corresponding to the uplink and downlink configuration 4 of the TDD;

the downlink subframe contained in the group 2 is {3}, determine the uplink subframes where the HARQ-ACK messages corresponding to the PDSCH of the group 2 are carried according to the HARQ timing relationship corresponding to the uplink and downlink configuration 5 of the TDD;

the downlink subframe contained in the group 3 is {2}, the uplink subframes where the HARQ-ACK messages corresponding to the PDSCH of the downlink subframe in the group 3 are carried are uplink subframes which have an interval of at least three subframes with the downlink subframe in the group 3.

Preferably, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprise:

when the TDD primary serving cell participating in the aggregation uses the uplink and downlink configuration 4, the downlink subframes of the FDD secondary serving cell being divided into three groups, wherein:

the group 1 comprises part of the downlink subframes having the same subframe numbers as the downlink subframes of the primary serving cell, determine the uplink subframes where the HARQ-ACK messages corresponding to the PDSCH of the group 1 are carried according to the HARQ timing relationship corresponding to the uplink and downlink configuration 4 of the TDD;

the downlink subframe contained in the group 2 is {3}, determine the uplink subframes where the HARQ-ACK messages corresponding to the PDSCH of the group 2 are carried according to the HARQ timing relationship corresponding to the uplink and downlink configuration 5 of the TDD;

the downlink subframes contained in the group 3 are {2} and the downlink subframes having the same subframe numbers as the downlink subframes of the primary serving cell except of the part in the group 1, the uplink subframes where the HARQ-ACK messages corresponding to the PDSCH of the downlink subframes in the group 3 are uplink subframes which have an interval of at least three subframes with the downlink subframes in the group 3.

Preferably, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprise:

when the TDD primary serving cell participating in the aggregation uses the uplink and downlink configuration 5, the downlink subframes of the FDD secondary serving cell being divided into two groups, wherein:

the group 1 comprises downlink subframes having the same subframe numbers as the downlink subframes of the primary serving cell, determine the uplink subframes where the HARQ-ACK messages corresponding to the PDSCH of the group 1 are carried according to the HARQ timing relationship corresponding to the uplink and downlink configuration 5 of the TDD;

the downlink subframe contained in the group 2 is {2}, the uplink subframes where the HARQ-ACK messages corresponding to the PDSCH of the downlink subframes in the group 2 are uplink subframes which have an interval of at least three subframes with the downlink subframe in the group 2.

Preferably, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprise:

when the TDD primary serving cell participating in the aggregation uses the uplink and downlink configuration 6, the downlink subframes of the FDD secondary serving cell being divided into three groups, wherein:
the group 1 comprises downlink subframes having the same subframe numbers as the downlink subframes of the primary serving cell, determine the uplink subframes where the HARQ-ACK messages corresponding to the PDSCH of the group 1 are carried according to the HARQ timing relationship corresponding to the uplink and downlink configuration 6 of the TDD;
the downlink subframe contained in the group 2 is {4}, determine the uplink subframes where the HARQ-ACK messages corresponding to the PDSCH of the group 2 are carried according to the HARQ timing relationship corresponding to the uplink and downlink configuration 1 of the TDD;
the downlink subframes contained in the group 3 are {2, 3, 7, 8} and the uplink subframes where the HARQ-ACK messages corresponding to the PDSCH of the downlink subframes in the group 3 are carried are uplink subframes which have an interval of at least three subframes with the downlink subframes in the group 3.

Preferably, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprise:

when the TDD primary serving cell participating in the aggregation uses the uplink and downlink configuration 6, the downlink subframes of the FDD secondary serving cell being divided into five groups, wherein:
the group 1 comprises part of the downlink subframes having the same subframe numbers as the downlink subframes of the primary serving cell, determine the uplink subframes where the HARQ-ACK messages corresponding to the PDSCH of the group 1 are carried according to the HARQ timing relationship corresponding to the uplink and downlink configuration 6 of the TDD;
the downlink subframe contained in the group 2 is {1}, determine the uplink subframes where the HARQ-ACK messages corresponding to the PDSCH of the group 2 are carried according to the HARQ timing relationship corresponding to the uplink and downlink configuration 0, 1 or 2 of the TDD;
the downlink subframe contained in the group 3 is {4}, determine the uplink subframes where the HARQ-ACK messages corresponding to the PDSCH of the group 3 are carried according to the HARQ timing relationship corresponding to the uplink and downlink configuration 2, 4 or 5 of the TDD;
the downlink subframe contained in the group 4 is {7}, determine the uplink subframes where the HARQ-ACK messages corresponding to the PDSCH of the group 4 are carried according to the HARQ timing relationship corresponding to the uplink and downlink configuration 3 or 4 of the TDD;
the downlink subframes contained in the group 5 are {2, 3, 8}, the uplink subframes where the HARQ-ACK messages corresponding to the PDSCH of the downlink subframes in the group 5 are uplink subframes which have an interval of at least three subframes with the downlink subframes in the group 5.

A device for sending answer information, comprising: a grouping unit, an uplink subframe determining unit and a sending unit, wherein:
the grouping unit is configured to: when a frequency division duplex (FDD) and a time division duplex (TDD) aggregate, where a TDD cell works as a primary serving cell and a FDD cell works as a secondary serving cell, group downlink subframes of the FDD secondary serving cell;
the uplink subframe determining unit is configured to: respectively use different hybrid automatic repeat request (HARQ) timing relationships for different downlink subframe groups, determine uplink subframes where the HARQ-ACK acknowledgment messages corresponding to the PDSCH transmitted on the downlink subframe group are carried;
the sending unit is configured to: send the HARQ-ACK messages on the uplink subframes determined by the uplink subframe determining unit.

Preferably, the uplink subframe determining unit is configured to: determine the uplink subframes where the HARQ-ACK messages corresponding to the PDSCH transmitted on the downlink subframe groups are carried according to the HARQ timing relationship corresponding to the TDD; or, determine to transmit the HARQ-ACK messages corresponding to the PDSCH of the downlink subframe groups on the uplink subframes which have an interval of at least three subframes with the downlink subframes.

Preferably, the grouping unit is configured to: group the downlink subframes of the FDD secondary serving cell according to the uplink and downlink configuration of the primary serving cell participating in the aggregation.

In summary, the embodiment of the present document can ensure reusing existing downlink timing relationships as much as possible, and need very little of extra standardization work; meanwhile, it is also able to ensure that the HARQ-ACK messages on the uplink subframe feeding back the HARQ-ACK messages are distributed uniformly as much as possible, and also ensure that the HARQ-ACK feedback delay is as small as possible.

PREFERRED EMBODIMENTS OF THE DOCUMENT

Figure 1:
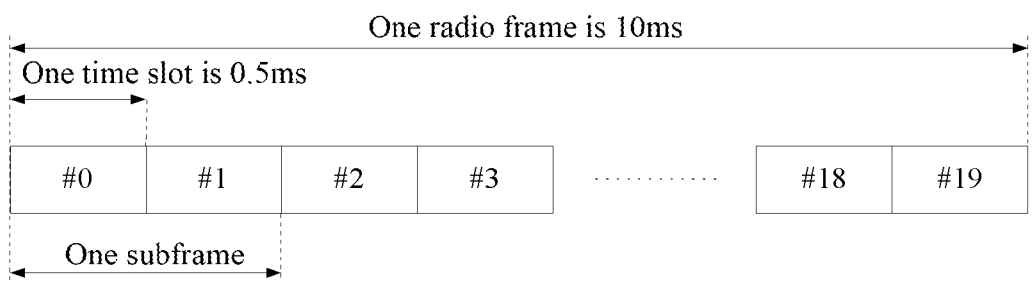
FIG. 1 is a schematic diagram of a frame structure in the FDD system in the related art.
Figure 2:
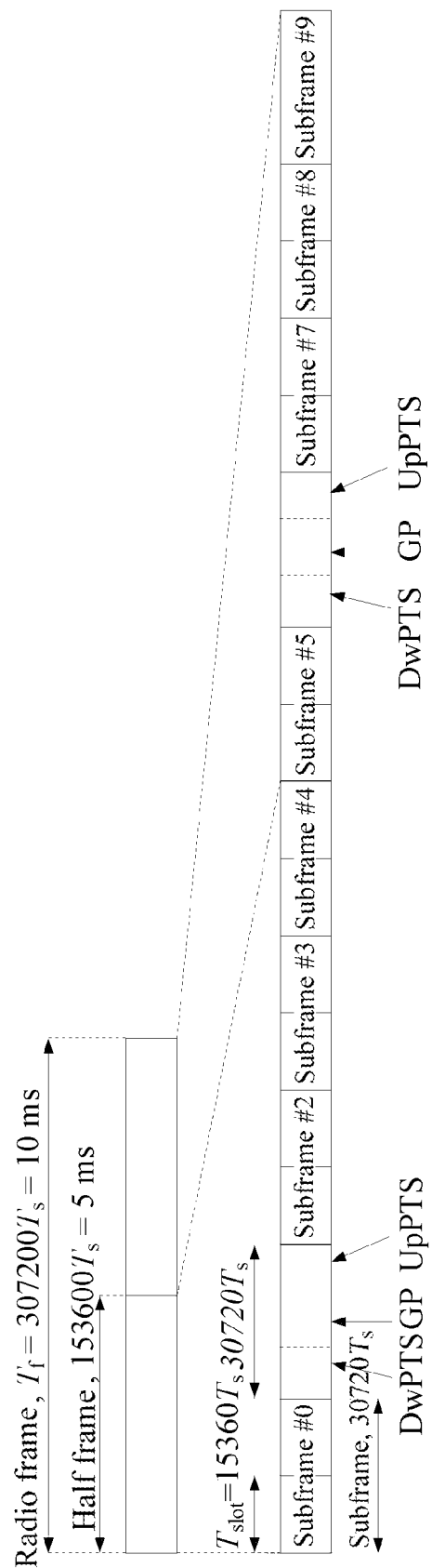
FIG. 2 is a schematic diagram of a frame structure in the TDD system in the related art.

The present embodiment provides a method for sending answer information, to solve the problem in sending the HARQ-ACK messages (also known as answer information) corresponding to the PDSCH of the FDD secondary serving cell when the TDD and the FDD aggregate, the FDD cell works as a primary serving cell, and the TDD cell works as a secondary serving cell, specifically as follows:

grouping downlink subframes of the FDD secondary serving cell;

different downlink subframe groups using different hybrid automatic repeat request (HARQ) timing relationships to determine uplink subframes where the HARQ-ACK messages corresponding to the PDSCH transmitted on respective downlink subframe groups are carried, transmitting the HARQ-ACK messages on the determined uplink subframes.

determining the uplink subframes where the HARQ-ACK messages corresponding to the PDSCH of the downlink subframe groups are carried in accordance with the HARQ timing relationship corresponding to the TDD; or, sending the HARQ-ACK messages corresponding to the PDSCH of the downlink subframe groups on the uplink subframes which have an interval of at least three subframes with the downlink subframes.

For different uplink and downlink configurations of the TDD primary serving cell participating in the aggregation, the downlink subframes of the FDD secondary serving cell respectively use different grouping methods.

Preferably, when the TDD primary serving cell participating in the aggregation uses the uplink and downlink configuration 0/1/2/3/4/5/6, the downlink subframes of the secondary serving cell FDD are divided into two groups, wherein:

the group 1 corresponds to the downlink subframe {2}, the uplink subframes where the HARQ-ACK messages corresponding to the PDSCH of the downlink subframes in the group 1 are uplink subframes which have an interval of at least three subframes with the downlink subframes in the group 1;

the group 2 corresponds to the downlink subframes other than the downlink subframe 2, that is, {0, 1, 3, 4, 5, 6, 7, 8, 9}, determine the uplink subframes where the HARQ-ACK messages corresponding to the PDSCH of the group 2 are carried according to the HARQ timing relationship corresponding to the uplink and downlink configuration 5 of the TDD.

Preferably, when the TDD primary serving cell participating in the aggregation uses the uplink and downlink configuration 0, the downlink subframes of the FDD secondary serving cell are divided into three groups, wherein:

the group 1 corresponds to the same downlink subframes of the TDD serving cell, that is, the group 1 comprises downlink subframes having the same subframe numbers as the downlink subframes of the primary serving cell, that is, the downlink subframes {0, 1, 5, 6}, the downlink subframes in the group 1 use the same PDSCH HARQ-ACK timing as the uplink and downlink configuration 0.

the group 2 corresponds to the downlink subframes {3, 8}, the downlink subframes in the group 2 use the same PDSCH HARQ-ACK timing relationship as the uplink and downlink configuration 2;

the group 3 corresponds to the downlink subframes {2, 4, 7, 9}, the uplink subframes where the HARQ-ACK messages corresponding to the PDSCH of the downlink subframes in the group 3 are uplink subframes which have an interval of at least three subframes with the downlink subframes in the group 3.

Preferably, when the TDD primary serving cell participating in the aggregation uses the uplink and downlink configuration 1, the downlink subframes of the FDD secondary serving cell are divided into two groups, wherein:

the group 1 corresponds to the same downlink subframes of the primary serving cell, that is, the downlink subframes {0, 1, 4, 5, 6, 9}, determine the uplink subframes where the HARQ-ACK messages corresponding to the PDSCH of the group 1 are carried according to the HARQ timing relationship corresponding to the uplink and downlink configuration 1 of the TDD;

the other subframes, that is, the downlink subframes {2, 3, 7, 8} correspond to the group 2, the uplink subframe where the HARQ-ACK messages corresponding to the PDSCH of the downlink subframes in the group 2 are carried are uplink subframes which have an interval of at least three subframes with the downlink subframes in the group 2.

Preferably, when the TDD primary serving cell participating in the aggregation uses the uplink and downlink configuration 2, the downlink subframes of the FDD secondary serving cell are divided into two groups, wherein:

the group 1 corresponds to the same downlink subframes of the TDD primary serving cell, that is, the downlink subframes {0, 1, 3, 4, 5, 6, 8, 9}, determine the uplink subframes where the HARQ-ACK messages corresponding to the PDSCH of the group 1 are carried according to the HARQ timing relationship corresponding to the uplink and downlink configuration 2 of the TDD;

the other downlink subframes, that is, the downlink subframes {2, 7} correspond to the group 2, the uplink subframes where the HARQ-ACK messages corresponding to the PDSCH of the downlink subframes in the group 2 are uplink subframes which have an interval of at least three subframes with the downlink subframes in the group 2.

Preferably, when the TDD serving cell participating in the aggregation uses the uplink and downlink configuration 3, the downlink subframes of the FDD secondary serving cell are divided into three groups, wherein:

the group 1 corresponds to the same downlink subframes of the TDD serving cell, that is, the downlink subframes {0, 1, 5, 6, 7, 8, 9}, determine the uplink subframes where the HARQ-ACK messages corresponding to the PDSCH of the group 1 are carried according to the HARQ timing relationship corresponding to the uplink and downlink configuration 3 of the TDD;

the group 2 corresponds to the downlink subframes {3, 4}, determine the uplink subframes where the HARQ-ACK messages corresponding to the PDSCH of the group 2 are carried according to the HARQ timing relationship corresponding to the uplink and downlink configuration 5 of the TDD;

the group 3 corresponds to the downlink subframe {2}, the uplink subframes where the HARQ-ACK messages corresponding to the PDSCH of the downlink subframe in the group 3 are uplink subframes which have an interval of at least three subframes with the downlink subframe in the group 3.

Preferably, when the TDD serving cell participating in the aggregation uses the uplink and downlink configuration 3, the downlink subframes of the FDD secondary serving cell are divided into three groups, wherein:

the group 1 corresponds to part of the same downlink subframes of the TDD serving cell, that is, the downlink subframes {0, 1, 7, 9}, determine the uplink subframes where the HARQ-ACK messages corresponding to the PDSCH of the group 1 are carried according to the HARQ timing relationship corresponding to the uplink and downlink configuration 3 of the TDD;

the group 2 corresponds to the downlink subframes {3, 4}, determine the uplink subframes where the HARQ-ACK messages corresponding to the PDSCH of the group 2 are transmitted according to the HARQ timing relationship corresponding to the uplink and downlink configuration 5 of the TDD;

the group 3 corresponds to the downlink subframes {2, 5, 6, 8}, the uplink subframes where the HARQ-ACK messages corresponding to the PDSCH of the downlink subframes in the group 3 are transmitted are uplink subframes which have an interval of at least three subframes with the downlink subframes in the group 3.

Preferably, when the TDD serving cell participating in the aggregation uses the uplink and downlink configuration 4, the downlink subframes of the FDD serving cell are divided into three groups, wherein:

the group 1 corresponds to the same downlink subframes of the TDD primary serving cell, that is, the downlink subframes {0, 1, 4, 5, 6, 7, 8, 9}, determine the uplink subframes where the HARQ-ACK messages corresponding to the PDSCH of the group 1 are transmitted according to the HARQ timing relationship corresponding to the uplink and downlink configuration 4 of the TDD;

the group 2 corresponds to the downlink subframe {3}, determine the uplink subframes where the HARQ-ACK messages corresponding to the PDSCH of the group 2 are transmitted according to the HARQ timing relationship corresponding to the uplink and downlink configuration 5 of the TDD;

the group 3 corresponds to the downlink subframe {2}, the uplink subframes where the HARQ-ACK messages corresponding to the PDSCH of the downlink subframes in the group 3 are carried are uplink subframes which have an interval of at least three subframes with the downlink subframe in the group 3.

Preferably, when the TDD primary serving cell participating in the aggregation uses the uplink and downlink configuration 4, the downlink subframes of the FDD serving cell are divided into three groups, wherein:

the group 1 corresponds to part of the same downlink subframes of the TDD primary serving cell, that is, the downlink subframes {0, 1, 4, 6, 7, 8, 9}, determine the uplink subframes where the HARQ-ACK messages corresponding to the PDSCH of the group 1 are transmitted according to the HARQ timing relationship corresponding to the uplink and downlink configuration 4 of the TDD;

the group 2 corresponds to the downlink subframe {3}, determine the uplink subframes where the HARQ-ACK messages corresponding to the PDSCH of the group 2 are carried according to the HARQ timing relationship corresponding to the uplink and downlink configuration 5 of the TDD;

the group 3 corresponds to the downlink subframes {2, 5}, the uplink subframes where the HARQ-ACK messages corresponding to the PDSCH of the downlink subframes in the group 3 are carried are uplink subframes which have an interval of at least three subframes with the downlink subframes in the group 3.

Preferably, when the TDD primary serving cell participating in the aggregation uses the uplink and downlink configuration 5, the downlink subframes in the FDD secondary serving cell are divided into two groups, wherein:

the group 1 corresponds to the same downlink subframes of the TDD primary serving cell, that is, the downlink subframes {0, 1, 3, 4, 5, 6, 7, 8, 9}, determine the uplink subframes where the HARQ-ACK messages corresponding to the PDSCH of the group 1 are transmitted according to the HARQ timing relationship corresponding to the uplink and downlink configuration 5 of the TDD;

the group 2 corresponds to the downlink subframe {2}, the uplink subframes where the HARQ-ACK messages corresponding to the PDSCH of the downlink subframe in the group 2 are transmitted are uplink subframes which have an interval of at least three subframes with the downlink subframe in the group 2.

Preferably, when the TDD serving cell participating in the aggregation uses the uplink and downlink configuration 6, the downlink subframes of the FDD secondary serving cell are divided into three groups, wherein:

the group 1 corresponds to the same downlink subframes of the TDD primary serving cell, that is, the downlink subframes {0, 1, 5, 6, 9}, determine the uplink subframes where the HARQ-ACK messages corresponding to the PDSCH of the group 1 are carried according to the HARQ timing relationship corresponding to the uplink and downlink configuration 6 of the TDD;

the group 2 corresponds to the downlink subframe {4}, determine the uplink subframes where the HARQ-ACK messages corresponding to the PDSCH of the group 2 are transmitted according to the HARQ timing relationship corresponding to the uplink and downlink configuration 1 of the TDD;

the group 3 corresponds to the downlink subframes {2, 3, 7, 8} and the uplink subframes where the HARQ-ACK messages corresponding to the PDSCH of the downlink subframes in the group 3 are carried are uplink subframes which have an interval of at least three subframes with the downlink subframes in the group 3.

Preferably, when the TDD serving cell participating in the aggregation uses the uplink and downlink configuration 6, the downlink subframes of the FDD serving cell are divided into five groups, wherein:

the group 1 corresponds to part of the same downlink subframes of the TDD primary serving cell, that is, the downlink subframes {0, 5, 6, 9}, determine the uplink subframes where the HARQ-ACK messages corresponding to the PDSCH of the group 1 are transmitted according to the HARQ timing relationship corresponding to the uplink and downlink configuration 6 of the TDD;

the group 2 corresponds to the downlink subframe {1}, determine the uplink subframes where the HARQ-ACK messages corresponding to the PDSCH of the group 2 are carried according to the HARQ timing relationship corresponding to the uplink and downlink configuration 0, 1 or 2 of the TDD;

the group 3 corresponds to the downlink subframe {4}, determine the uplink subframes where the HARQ-ACK messages corresponding to the PDSCH of the group 3 are carried according to the HARQ timing relationship corresponding to the uplink and downlink configuration 2, 4 or 5 of the TDD;

the group 4 corresponds to the downlink subframe {7}, determine the uplink subframes where the HARQ-ACK messages corresponding to the PDSCH of the group 4 are carried according to the HARQ timing relationship corresponding to the uplink and downlink configuration 3 or 4 of the TDD;

the group 5 corresponds to the downlink subframes {2, 3, 8}, the uplink subframes where the HARQ-ACK messages corresponding to the PDSCH of the downlink subframes in the group 5 are uplink subframes which have an interval of at least three subframes with the downlink subframes in the group 5.

To make objectives, technical solutions and advantages of the present document more apparent, hereinafter in conjunction with the accompanying drawings, the embodiments of the present document will be described in detail. It should be noted that in the case of no conflict, the embodiments and features in the embodiments of the present application may be arbitrarily combined with each other.

Embodiment 1-1

Figure 3:
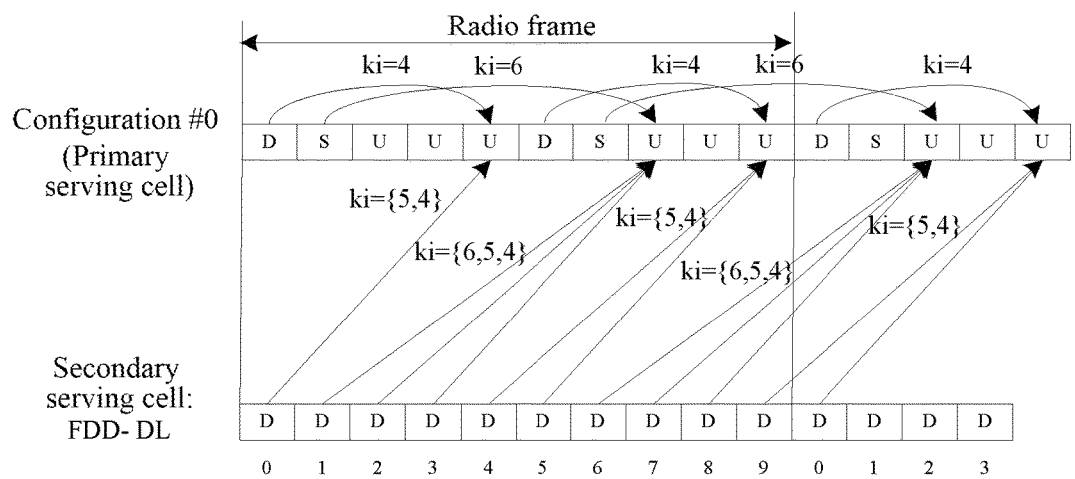
FIG. 3 is a schematic diagram of an embodiment 1-1 of the present document.

As shown in FIG. 3, the TDD primary serving cell and the FDD secondary serving cell whose uplink and downlink configuration is configuration #0 aggregate.

The downlink subframes of the FDD secondary serving cell are divided into three groups, wherein the group 1 comprises downlink subframes {0, 1, 5, 6} the same as those of the primary serving cell, its HARQ timing relationship is also the same as the downlink subframes {0, 1, 5, 6} of the primary serving cell, that is:

for the PDSCH transmitted by the FDD secondary serving cell on the downlink subframe 0 of the current radio frame, its corresponding HARQ-ACK messages are transmitted on the uplink subframe 4 of the current radio frame;

for the PDSCH transmitted by the FDD secondary serving cell on the downlink subframe 1 of the current radio frame, its corresponding HARQ-ACK messages are transmitted on the uplink subframe 7 of the current radio frame;

for the PDSCH transmitted by the secondary serving cell FDD on the downlink subframe 5 of the current radio frame, its corresponding HARQ-ACK messages are transmitted on the uplink subframe 9 of the current radio frame;

for the PDSCH transmitted by the FDD secondary serving cell on the downlink subframe 6 of the current radio frame, its corresponding HARQ-ACK messages are transmitted on the uplink subframe 2 of the current radio frame.

The remaining subframes are then divided into two groups:

the group 2 comprises the downlink subframes {3, 8}, the downlink subframes in the group 2 use the same HARQ timing relationship as the uplink and downlink configuration 2, that is:

for the PDSCH transmitted by the FDD secondary serving cell on the downlink subframe 3 of the current radio frame, its corresponding HARQ-ACK messages are transmitted on the uplink subframe 7 of the current radio frame;

for the PDSCH transmitted by the FDD secondary serving cell on the downlink subframe 8 of the current radio frame, its corresponding HARQ-ACK messages are transmitted on the uplink subframe 2 of the next radio frame.

The group 3 comprises the downlink subframes {2, 4, 7, 9}, and the uplink subframes where the HARQ-ACK messages corresponding to the PDSCH of the downlink subframes in the group 3 are carried are uplink subframes which have an interval of at least three subframes with the downlink subframes in the group 3:

for the PDSCH transmitted by the FDD secondary serving cell on the downlink subframe 2 of the current radio frame, its corresponding HARQ-ACK messages are transmitted on the uplink subframe 7 of the current radio frame;

for the PDSCH transmitted by the FDD secondary serving cell on the downlink subframe 4 of the current radio frame, its corresponding HARQ-ACK messages are transmitted on the uplink subframe 9 of the current radio frame;

for the PDSCH transmitted by the FDD secondary serving cell on the downlink subframe 7 of the current radio frame, its corresponding HARQ-ACK messages are transmitted on the uplink subframe 2 of the next radio frame;

for the PDSCH transmitted by the FDD secondary serving cell on the downlink subframe 9 of the current radio frame, its corresponding HARQ-ACK messages are transmitted on the uplink subframe 4 of the next radio frame.

As can be seen from FIG. 3, the numbers of HARQ-ACK messages fed back on the uplink subframes 2, 4, 7, 9 transmitting the HARQ-ACK messages are 3, 2, 3, 2 respectively, which is relatively uniform. It can also be seen from here that, the HARQ-ACK message feedback delay of each downlink subframe is not the minimum, for example, the HARQ-ACK messages on the downlink subframe 4 are not selected to transmit on the uplink subframe 8 which has the minimum feedback delay. It can be seen from here that, the HARQ-ACK message feedback delay being the minimum and the number of HARQ-ACK messages fed back on the uplink subframes transmitting the HARQ-ACK messages being as uniform as possible cannot be satisfied simultaneously in some scenarios.

Embodiment 1-2

Figure 4:
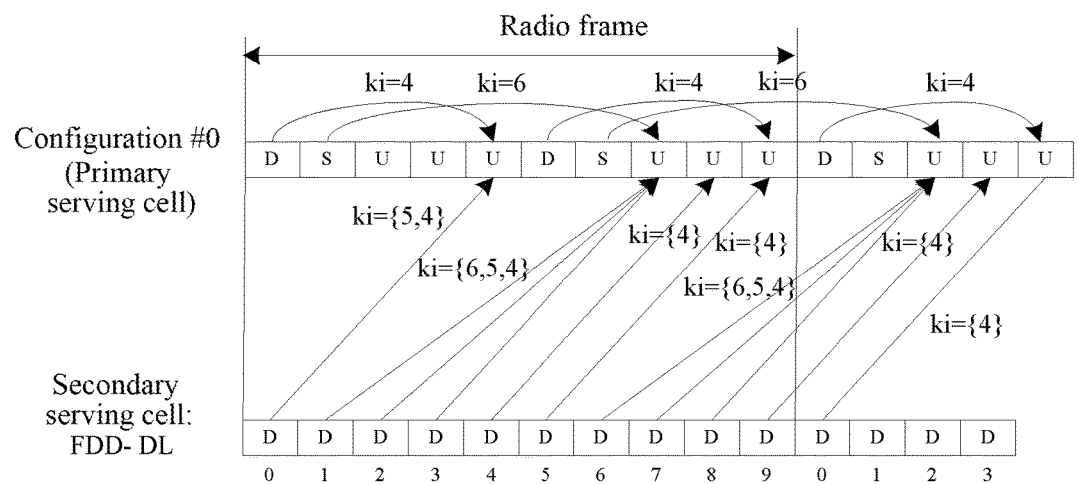
FIG. 4 is a schematic diagram of an embodiment 1-2 of the present document.

As shown in FIG. 4, the TDD serving cell and the FDD serving cell whose uplink and downlink configuration is configuration #0 aggregate.

The downlink subframes of the FDD serving cell are divided into three groups, wherein the group 1 comprises the same downlink subframes {0, 1, 5, 6} of the primary serving cell, its HARQ timing relationship is the same as the downlink subframes {0, 1, 5, 6} of the primary serving cell, and its PDSCH HARQ-ACK is the same as the embodiment 1-1 and not repeated here.

The remaining subframes are then divided into two groups:
the group 2 comprises the downlink subframes {3, 8}, the downlink subframes in the group 2 use the same HARQ timing relationship as the uplink and downlink configuration 2, and its PDSCH HARQ-ACK is the same as the embodiment 1-1 and not repeated here.

The group 3 comprises the downlink subframes {2, 4, 7, 9}, the uplink subframes where the HARQ-ACK messages corresponding to the PDSCH of the downlink subframes in the group 3 are carried are uplink subframes which have an interval of at least three subframes with the downlink subframes in the group 3:
for the PDSCH transmitted by the FDD serving cell on the downlink subframe 2 of the current radio frame, its corresponding HARQ-ACK messages are transmitted on the uplink subframe 7 of the current radio frame;
for the PDSCH transmitted by the FDD serving cell on the downlink subframe 4 of the current radio frame, its corresponding HARQ-ACK messages are transmitted on the uplink subframe 8 of the current radio frame;
for the PDSCH transmitted by the FDD serving cell on the downlink subframe 7 of the current radio frame, its corresponding HARQ-ACK messages are transmitted on the uplink subframe 2 of the next radio frame;
for the PDSCH transmitted by the FDD serving cell on the downlink subframe 9 of the current radio frame, its corresponding HARQ-ACK messages are transmitted on the uplink subframe 3 of the next radio frame.

As can be seen from FIG. 4, the numbers of HARQ-ACK messages fed back on the uplink subframes 2, 3, 4, 7, 8, 9 transmitting the HARQ-ACK messages are 3, 1, 1, 3, 1, 1 respectively, which is relatively non-uniform. It can also be seen from here that, the HARQ-ACK feedback delay of each downlink subframe is the minimum. In addition, it is worth mentioning that, in this design, the uplink subframes 3 and 8 which originally are not needed for feeding back the HARQ-ACK messages of the primary serving cell are needed for feeding back the HARQ-ACK messages of the secondary serving cell.

Embodiment 2-1

Figure 5:
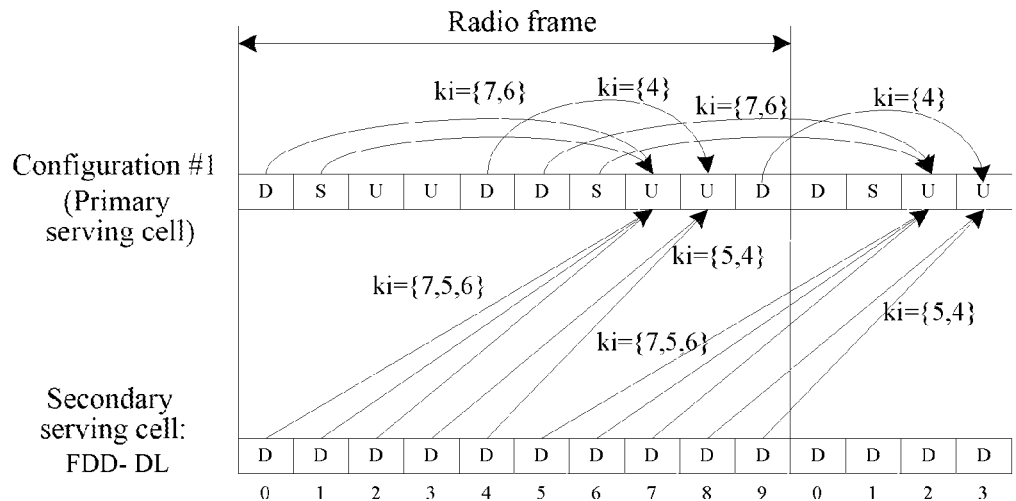
FIG. 5 is a schematic diagram of an embodiment 2-1 of the present document.

As shown in FIG. 5, the TDD serving cell and the FDD serving cell whose uplink and downlink configuration is configuration #1 aggregate.

The downlink subframes of the FDD serving cell are divided into two groups, wherein the group 1 comprises the same downlink subframes {0, 1, 4, 5, 6, 9} of the primary serving cell, its HARQ timing relationship is the same as the downlink subframes {0, 1, 4, 5, 6, 9} of the primary serving cell, that is:
for the PDSCH transmitted by the FDD serving cell on the downlink subframe 0/1 of the current radio frame, its corresponding HARQ-ACK messages are transmitted on the uplink subframe 7 of the current radio frame;
for the PDSCH transmitted by the FDD serving cell on the downlink subframe 4 of the current radio frame, its corresponding HARQ-ACK messages are transmitted on the uplink subframe 8 of the current radio frame;
for the PDSCH transmitted by the FDD serving cell on the downlink subframe 5/6 of the current radio frame, its corresponding HARQ-ACK messages is transmitted on the uplink subframe 2 of the next radio frame;
for the PDSCH transmitted by the FDD serving cell on the downlink subframe 9 of the current radio frame, its corresponding HARQ-ACK messages is transmitted on the uplink subframe 3 of the next radio frame.

The remaining subframes are divided into one group:
the group 2 comprises the downlink subframes {2, 3, 7, 8}, the uplink subframes where the HARQ-ACK messages corresponding to the PDSCH of the downlink subframes in the group 2 are carried are uplink subframes which have an interval of at least three subframes with the downlink subframes in the group 2:
for the PDSCH transmitted by the FDD serving cell on the downlink subframe 2 of the current radio frame, its corresponding HARQ-ACK messages are transmitted on the uplink subframe 7 of the current radio frame;
for the PDSCH transmitted by the FDD serving cell on the downlink subframe 3 of the current radio frame, its corresponding HARQ-ACK messages are transmitted on the uplink subframe 8 of the current radio frame;
for the PDSCH transmitted by the FDD serving cell on the downlink subframe 7 of the current radio frame, its corresponding HARQ-ACK messages are transmitted on the uplink subframe 2 of the next radio frame;
for the PDSCH transmitted by the FDD serving cell on the downlink subframe 8 of the current radio frame, its corresponding HARQ-ACK messages are transmitted on the uplink subframe 3 of the next radio frame.

As we can see from FIG. 5, the numbers of HARQ-ACK messages fed back on the uplink subframes 2, 3, 7, 8 transmitting the HARQ-ACK messages are 3, 2, 3, 2 respectively, which is relatively uniform. We can also see from here that, the HARQ-ACK feedback delay of each downlink subframe is not the minimum, for example, the HARQ-ACK messages on the downlink subframe 3 are not selected to transmit on the uplink subframe 7 with the minimum feedback delay.

Embodiment 2-2

Figure 6:
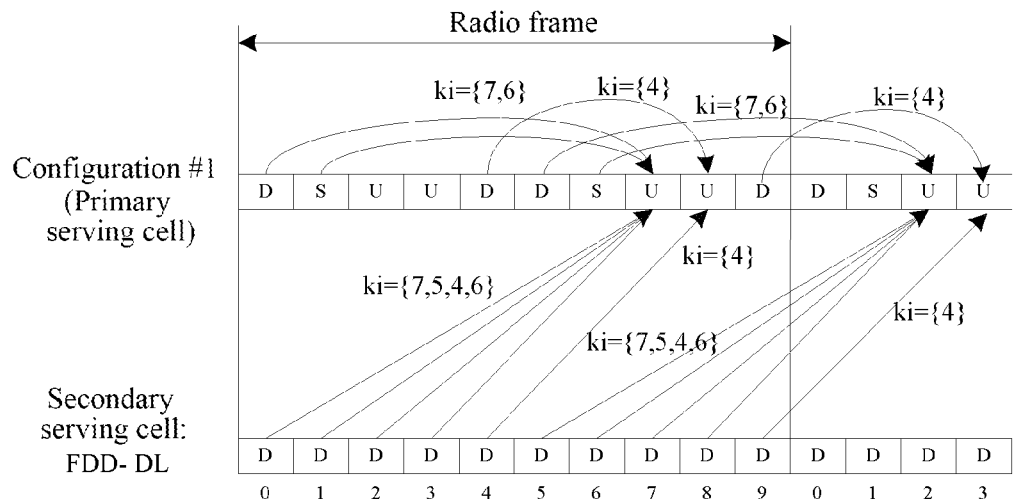
FIG. 6 is a schematic diagram of an embodiment 2-2 of the present document.

As shown in FIG. 6, the TDD serving cell and the FDD serving cell whose uplink and downlink configuration is configuration #1 aggregate.

The downlink subframes of the FDD serving cell are divided into two groups, wherein the group 1 comprises the same downlink subframes {0, 1, 4, 5, 6, 9} as the primary serving cell, its HARQ timing relationship is the same as the downlink subframes {0, 1, 4, 5, 6, 9} of the primary serving cell, and its PDSCH HARQ-ACK is the same as the embodiment 2-1 and is not repeated here.

The remaining subframes are divided into one group.

The group 2 comprises the downlink subframes {2, 3, 7, 8}, the uplink subframes where the HARQ-ACK messages corresponding to the PDSCH of the downlink subframes in the group 2 are carried are uplink subframes which have an interval of at least three subframes with the downlink subframes in the group 2:
for the PDSCH transmitted by the FDD serving cell on the downlink subframe 2/3 of the current radio frame, its corresponding HARQ-ACK messages are transmitted on the uplink subframe 7 of the current radio frame;
for the PDSCH transmitted by the FDD serving cell on the downlink subframe 7/8 of the current radio frame, its corresponding HARQ-ACK messages are transmitted on the uplink subframe 2 of the next radio frame.

As we can see from FIG. 6, the numbers of HARQ-ACK messages fed back on the uplink subframes 2, 3, 7, 8 transmitting the HARQ-ACK messages are 4, 1, 4, 1 respectively, which is relatively non-uniform. We can also see from here that, the HARQ-ACK feedback delay of each downlink subframe is the minimum.

Embodiment 3

Figure 7:
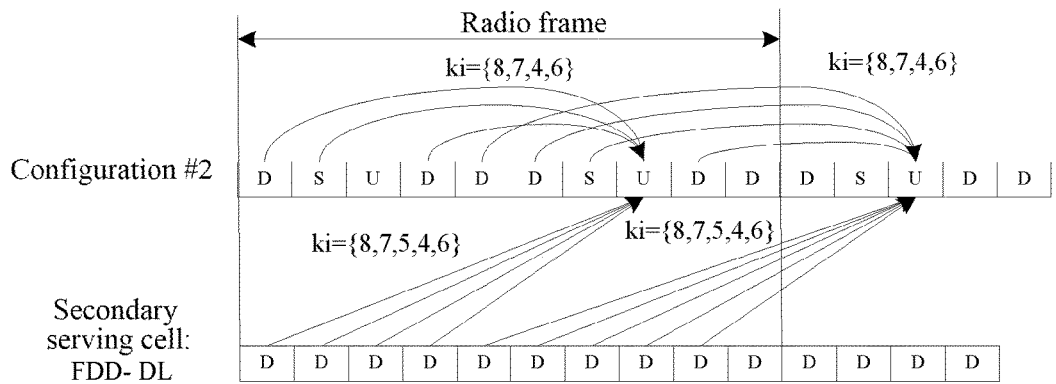
FIG. 7 is a schematic diagram of a third embodiment of the present document.

As shown in FIG. 7, the TDD serving cell and the FDD serving cell whose uplink and downlink configuration is configuration #2 aggregate.

The downlink subframes of the FDD serving cell are divided into two groups, wherein the group 1 comprises the same downlink subframes {0, 1, 3, 4, 5, 6, 8, 9} of the primary serving cell, and its HARQ timing relationship is the same as the downlink subframes {0, 1, 3, 4, 5, 6, 8, 9} of the primary serving cell, that is:

for the PDSCH transmitted by the FDD serving cell on the downlink subframe 0/1/3 of the current radio frame, its corresponding HARQ-ACK messages are transmitted on the uplink subframe 7 of the current radio frame;

for the PDSCH transmitted by the FDD serving cell on the downlink subframe 4 of the current radio frame, its corresponding HARQ-ACK messages are transmitted on the uplink subframe 2 of the next radio frame;

for the PDSCH transmitted by the FDD serving cell on the downlink subframe 5/6/8 of the current radio frame, its corresponding HARQ-ACK messages are transmitted on the uplink subframe 2 of the next radio frame;

for the PDSCH transmitted by the FDD secondary serving cell on the downlink subframe 9 of the current radio frame, its corresponding HARQ-ACK messages corresponding to the are transmitted on the uplink subframe 7 of the next radio frame.

The remaining subframes are then divided into one group.

When the group 2 comprises the downlink subframes {2, 7}, the uplink subframes where the HARQ-ACK messages corresponding to the PDSCH of the downlink subframes in the group 2 are carried are uplink subframes which have an interval of at least three subframes with the downlink subframes in the group 2:

for the PDSCH transmitted by the FDD serving cell on the downlink subframe 2 of the current radio frame, its corresponding HARQ-ACK messages are transmitted on the uplink subframe 7 of the current radio frame;

for the PDSCH transmitted by the FDD serving cell on the downlink subframe 7 of the current radio frame, its corresponding HARQ-ACK messages are transmitted on the uplink subframe 2 of the next radio frame.

As we can see from FIG. 7, the numbers of HARQ-ACK messages fed back on the uplink subframes 2, 7 transmitting the HARQ-ACK messages are 5, 5 respectively, which is very uniform. We can also see from here that, the HARQ-ACK feedback delay of each downlink subframe is the minimum.

Embodiment 4-1

Figure 8:
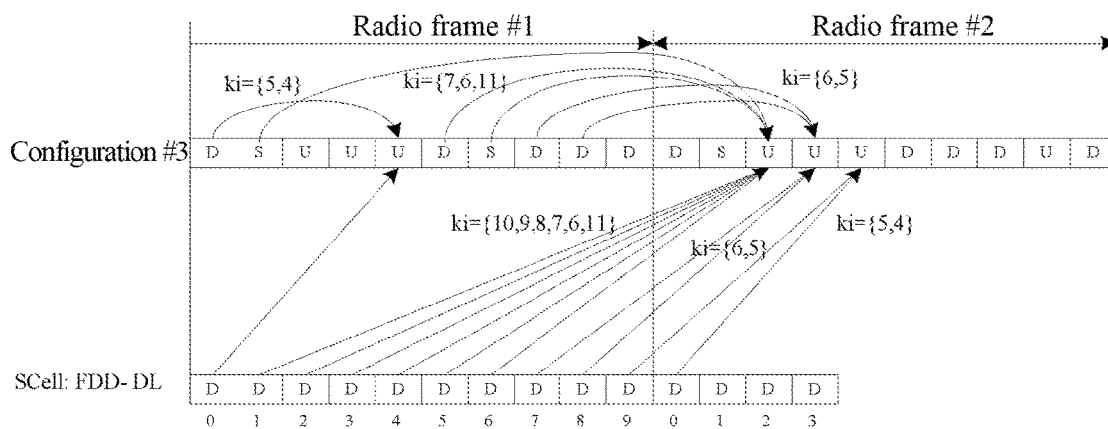
FIG. 8 is a schematic diagram of an embodiment 4-1 of the present document.

As shown in FIG. 8, the TDD serving cell and the FDD serving cell whose uplink and downlink configuration is configuration #3 aggregate.

The downlink subframes of the FDD serving cell are divided into three groups, wherein the group 1 comprises the same downlink subframes {0, 1, 5, 6, 7, 8, 9} as the primary serving cell, its HARQ timing relationship is the same as the downlink subframes {0, 1, 5, 6, 7, 8, 9} of the primary serving cell, that is:

for the PDSCH transmitted by the FDD serving cell on the downlink subframe 0 of the current radio frame, its corresponding HARQ-ACK messages are transmitted on the uplink subframe 4 of the current radio frame;

for the PDSCH transmitted by the FDD serving cell on the downlink subframe 1/5/6 of the current radio frame, its corresponding HARQ-ACK messages are transmitted on the uplink subframe 2 of the next radio frame;

for the PDSCH transmitted by the FDD serving cell on the downlink subframe 7/8 of the current radio frame, its corresponding HARQ-ACK messages are transmitted on the uplink subframe 3 of the next radio frame;

for the PDSCH transmitted by the FDD serving cell on the downlink subframe 9 of the current radio frame, its corresponding HARQ-ACK messages are transmitted on the uplink subframe 4 of the next radio frame.

the remaining subframes are divided into two groups.

The group 2 corresponds to the downlink subframes {3, 4}, the downlink subframes in the group 2 use the same HARQ timing relationship as the uplink and downlink configuration 5, that is:

for the PDSCH transmitted by the FDD serving cell on the downlink subframe 3/4 of the current radio frame, its corresponding HARQ-ACK messages are transmitted on the uplink subframe 2 of the next radio frame;

the group 3 corresponds to the downlink subframe {2}, and the uplink subframes where the HARQ-ACK messages corresponding to the PDSCH of the downlink subframe in the group 3 are carried are uplink subframes which have an interval of at least three subframes with the downlink subframe in the group 3:

for the PDSCH transmitted by the FDD serving cell on the downlink subframe 2 of the current radio frame, the HARQ-ACK messages are transmitted on the uplink subframe 2 of the current radio frame;

As we can see from FIG. 8, the numbers of HARQ-ACK messages fed back on the uplink subframes 2, 3, 4, transmitting the HARQ-ACK messages are 6, 2, 2 respectively, which is very non-uniform. We can also see from here that, the HARQ-ACK feedback delay of each downlink subframe in the group 2 and the group 3 is the minimum.

Embodiment 4-2

Figure 9:
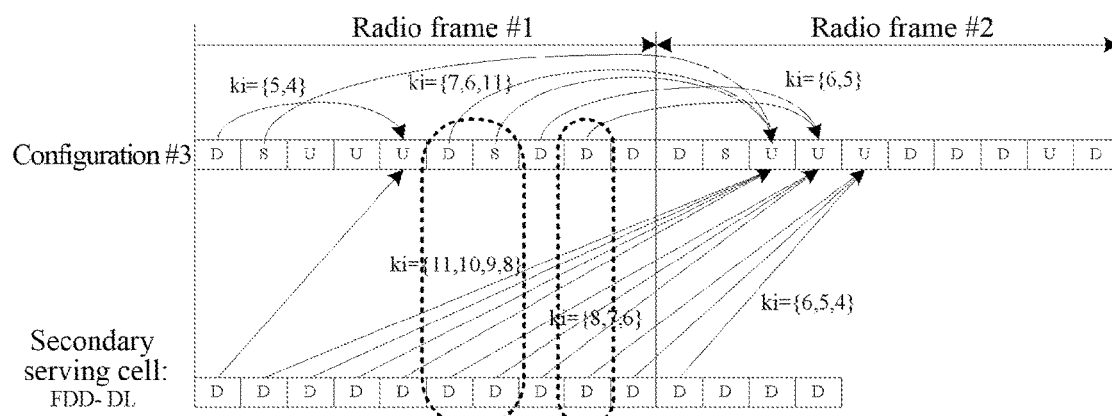
FIG. 9 is a schematic diagram of an embodiment 4-2 of the present document.

As shown in FIG. 9, the TDD serving cell and the FDD serving cell whose uplink and downlink configuration is configuration #3 aggregate.

The downlink subframes of the FDD serving cell are divided into three groups, wherein the group 1 corresponds to the part of downlink subframes the same as the TDD serving cell, that is, the downlink subframes {0, 1, 7, 9}, the downlink subframes in the group 1 use the same HARQ timing relationship as the uplink and downlink configuration 3, and its PDSCH HARQ-ACK is the same as the embodiment 4-1 and is not repeated here.

The remaining subframes are divided into two groups.

The group 2 corresponds to the downlink subframes {3, 4}, the downlink subframes in the group 2 use the same HARQ timing relationship as the uplink and downlink configuration 5, its PDSCH HARQ-ACK is the same as the embodiment 4-1 and is not repeated here.

The group 3 comprises the downlink subframes {2, 5, 6, 8} and the uplink subframes where the HARQ-ACK messages corresponding to the PDSCH of the downlink subframes in the group 3 are carried are uplink subframes which have an interval of at least three subframes with the downlink subframes in the group 3:

for the PDSCH transmitted by the FDD serving cell on the downlink subframe 2 of the current radio frame, its corresponding HARQ-ACK messages are transmitted on the uplink subframe 2 of the current radio frame;

for the PDSCH transmitted by the FDD serving cell on the downlink subframe 5 of the current radio frame, its corresponding HARQ-ACK messages are transmitted on the uplink subframe 3 of the next radio frame;

for the PDSCH transmitted by the FDD serving cell on the downlink subframe 6 of the current radio frame, its corresponding HARQ-ACK messages are transmitted on the uplink subframe 3 of the next radio frame;

for the PDSCH transmitted by the FDD serving cell on the downlink subframe 8 of the current radio frame, its corresponding HARQ-ACK messages are transmitted on the uplink subframe 4 of the next radio frame.

As we can see from FIG. 9, the numbers of HARQ-ACK messages fed back on the uplink subframes 2, 3, 4, transmitting the HARQ-ACK messages are 4, 3, 3 respectively, which is relatively uniform. We can also see from here that, the HARQ-ACK feedback delay of each downlink subframe in the group 2 and the group 3 is not the minimum.

Embodiment 5-1

Figure 10:
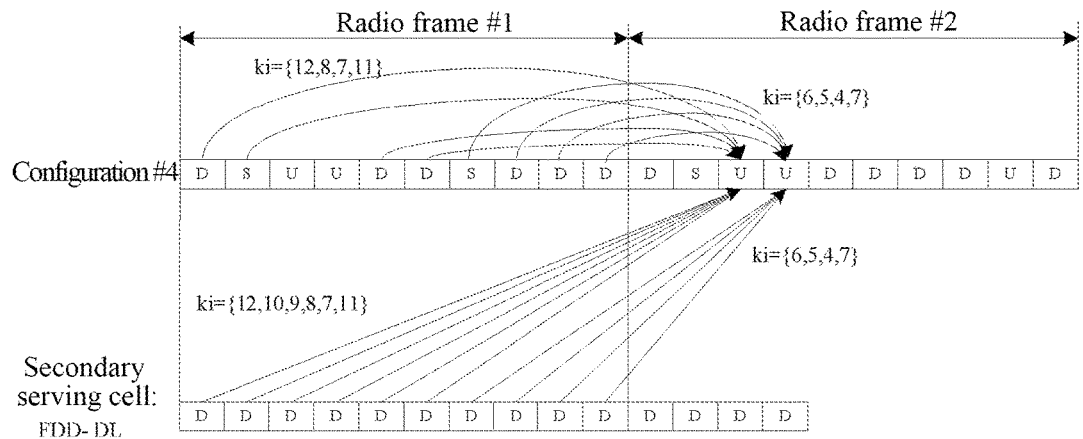
FIG. 10 is a schematic diagram of an embodiment 5-1 of the present document.

As shown in FIG. 10, the TDD serving cell and the FDD serving cell whose uplink and downlink configuration is configuration #4 aggregate.

The downlink subframes of the FDD serving cell are divided into three groups, wherein the group 1 comprises the same downlink subframes {0, 1, 4, 5, 6, 7, 8, 9} of the primary serving cell, its HARQ timing relationship is the same as the downlink subframes {0, 1, 4, 5, 6, 7, 8, 9} of the primary serving cell, that is:

for the PDSCH transmitted by the FDD serving cell on the downlink subframe 0/1/4/5 of the current radio frame, its corresponding HARQ-ACK messages are transmitted on the uplink subframe 2 of the next radio frame;

for the PDSCH transmitted by the FDD serving cell on the downlink subframe 6/7/8/9 of the current radio frame, its corresponding HARQ-ACK messages are transmitted on the uplink subframe 3 of the next radio frame;

the remaining subframes are divided into two groups.

The group 2 corresponds to the downlink subframe {3}, the downlink subframe in the group 2 uses the same HARQ timing relationship as the uplink and downlink configuration 5, that is:

for the PDSCH transmitted by the FDD serving cell on the downlink subframe 3 of the current radio frame, its corresponding HARQ-ACK messages are transmitted on the uplink subframe 2 of the next radio frame;

the group 3 corresponds to the downlink subframe {2} and the uplink subframes where the HARQ-ACK messages corresponding to the PDSCH of the downlink subframes in the group 3 are carried are uplink subframes which have an interval of at least three subframes with the downlink subframe in the group 3:

for the PDSCH transmitted by the FDD serving cell on the downlink subframe 2 of the current radio frame, its corresponding HARQ-ACK messages are transmitted on the uplink subframe 2 of the current radio frame.

As we can see from FIG. 10, the numbers of HARQ-ACK messages fed back on the uplink subframes 2, 3 transmitting the HARQ-ACK messages are 6, 4 respectively, which is very non-uniform. We can also see from here that, the HARQ-ACK feedback delay of each downlink subframe in the group 2 and the group 3 is the minimum.

Embodiment 5-2

Figure 11:
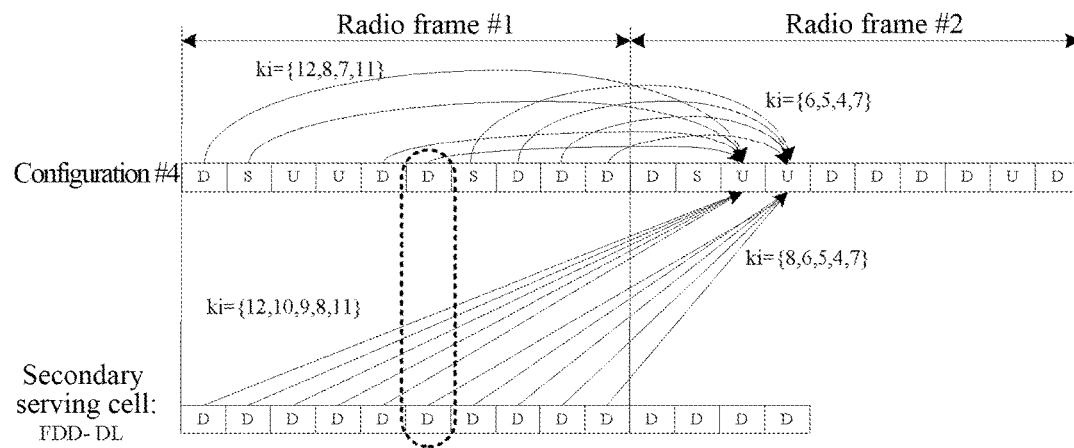
FIG. 11 is a schematic diagram of an embodiment 5-2 of the present document.

As shown in FIG. 11, the TDD serving cell and the FDD serving cell whose uplink and downlink configuration is configuration #4 aggregate.

The downlink subframes of the FDD serving cell are divided into three groups, wherein the group 1 comprises the same downlink subframes as the TDD serving cell, that is, the downlink subframes {0, 1, 7, 9}, the downlink subframes in the group 1 use the same HARQ timing relationship as the uplink and downlink configuration 4, its PDSCH HARQ-ACK is the same as the embodiment 5-1 and is not repeated here.

The remaining subframes are divided into two groups.

The group 2 corresponds to the downlink subframe 131, the downlink subframe in the group 2 uses the same HARQ timing relationship as the uplink and downlink configuration 5; its PDSCH HARQ-ACK is the same as the embodiment 5-1 and is not repeated here.

The group 3 comprises the downlink subframes {2, 5} and the uplink subframes where the HARQ-ACK messages corresponding to the PDSCH of the downlink subframes in the group 3 are carried are uplink subframes which have an interval of at least three subframes with the downlink subframes in the group 3:

for the PDSCH transmitted by the FDD serving cell on the downlink subframe 2 of the current radio frame, its corresponding HARQ-ACK messages are transmitted on the uplink subframe 2 of the current radio frame;

for the PDSCH transmitted by the FDD serving cell on the downlink subframe 5 of the current radio frame, its corresponding HARQ-ACK messages are transmitted on the uplink subframe 3 of the next radio frame;

for the PDSCH transmitted by the FDD serving cell on the downlink subframe 8 of the current radio frame, its corresponding HARQ-ACK messages are transmitted on the uplink subframe 4 of the next radio frame.

As we can see from FIG. 11, the numbers of HARQ-ACK messages fed back on the uplink subframes 2, 3 transmitting the HARQ-ACK messages are 5, 5 respectively, which is very uniform. We can also see from here that, the HARQ-ACK feedback delay of each downlink subframe in the group 2 and the group 3 is not the minimum.

Embodiment 6-1

Figure 12:
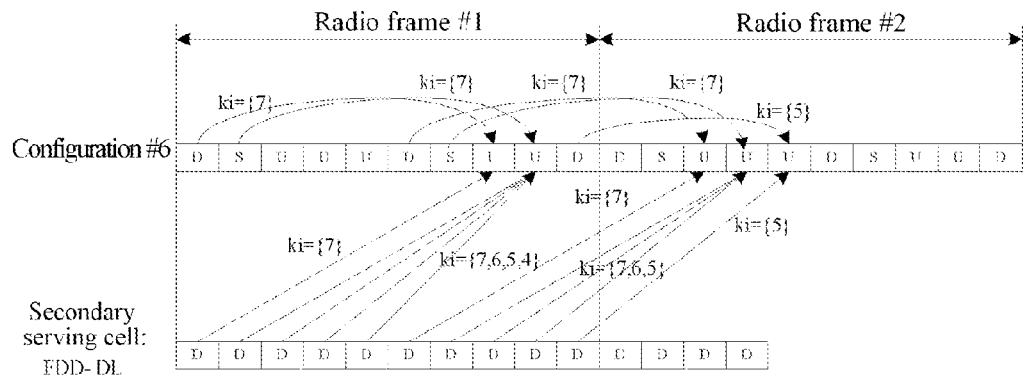
FIG. 12 is a schematic diagram of an embodiment 6-1 of the present document.

As shown in FIG. 12, the TDD serving cell and the FDD serving cell whose uplink and downlink configuration is configuration #6 aggregate.

The downlink subframes of the FDD serving cell are divided into three groups, wherein the group 1 comprises the same downlink subframes {0, 1, 5, 6, 9} as the primary serving cell, its HARQ timing relationship is the same as the downlink subframes {0, 1, 5, 6, 9} of the primary serving cell, that is:

for the PDSCH transmitted by the FDD serving cell on the downlink subframe 0 of the current radio frame, its corresponding HARQ-ACK messages are transmitted on the uplink subframe 7 of the current radio frame;

for the PDSCH transmitted by the FDD serving cell on the downlink subframe 1 of the current radio frame, its corresponding HARQ-ACK messages are transmitted on the uplink subframe 8 of the current radio frame;

for the PDSCH transmitted by the FDD serving cell on the downlink subframe 5 of the current radio frame, its corresponding HARQ-ACK messages are transmitted on the uplink subframe 2 of the next radio frame;

for the PDSCH transmitted by the FDD serving cell on the downlink subframe 6 of the current radio frame, its corresponding HARQ-ACK messages are transmitted on the uplink subframe 3 of the next radio frame;

for the PDSCH transmitted by the FDD serving cell on the downlink subframe 9 of the current radio frame, its corresponding HARQ-ACK messages are transmitted on the uplink subframe 4 of the next radio frame;

the remaining subframes are divided into two groups.

The group 2 corresponds to the downlink subframe {4}, the downlink subframe in the group 2 uses the same HARQ timing relationship as the uplink and downlink configuration 1, that is:

for the PDSCH transmitted by the FDD serving cell on the downlink subframe 4 of the current radio frame, its corresponding HARQ-ACK messages are transmitted on the uplink subframe 8 of the current radio frame;

the group 3 comprises the downlink subframes {2, 3, 7, 8}, and the uplink subframes where the HARQ-ACK messages corresponding to the PDSCH of the downlink subframes in the group 3 are carried are uplink subframes which have an interval of at least three subframes with the downlink subframes in the group 3:

for the PDSCH transmitted by the FDD serving cell on the downlink subframe 2 of the current radio frame, its corresponding HARQ-ACK messages are transmitted on the uplink subframe 8 of the current radio frame;

for the PDSCH transmitted by the FDD serving cell on the downlink subframe 3 of the current radio frame, its corresponding HARQ-ACK messages are transmitted on the uplink subframe 8 of the current radio frame;

for the PDSCH transmitted by the FDD serving cell on the downlink subframe 7 of the current radio frame, its corresponding HARQ-ACK messages are transmitted on the uplink subframe 3 of the current radio frame;

for the PDSCH transmitted by the FDD serving cell on the downlink subframe 8 of the current radio frame, its corresponding HARQ-ACK messages are transmitted on the uplink subframe 3 of the current radio frame.

As we can see from FIG. 12, the numbers of HARQ-ACK messages fed back on the uplink subframes 2, 3, 4, 7, 8 transmitting the HARQ-ACK messages are 1, 4, 1, 3, 1 respectively, which is very non-uniform. We can also see from here that, the HARQ-ACK feedback delay of each downlink subframe is the minimum.

Embodiment 6-2

Figure 13:
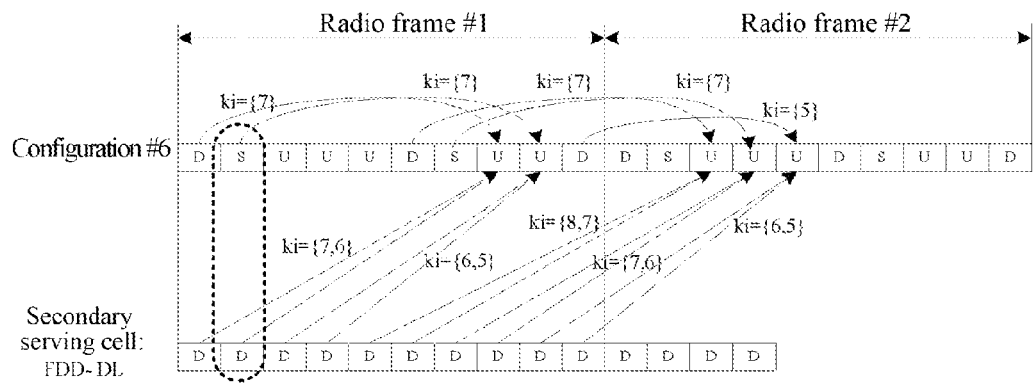
FIG. 13 is a schematic diagram of an embodiment 6-2 of the present document.

As shown in FIG. 13, the TDD serving cell and the FDD serving cell whose uplink and downlink configuration is configuration #6 aggregate.

The downlink subframes of the FDD serving cell are divided into five groups, wherein the group 1 corresponds to part of the same downlink subframes of the TDD serving cell, that is, the downlink subframes {0, 1, 7, 9}, the downlink subframes in the group 1 use the same HARQ timing relationship as the uplink and downlink configuration 6, and its PDSCH HARQ-ACK is the same as the embodiment 6-1 and is not repeated here.

The group 2 corresponds to the downlink subframe 111, the downlink subframe in the group 2 uses the PDSCH HARQ-ACK timing of the uplink and downlink configuration 0/1/2, that is, for the PDSCH transmitted by the FDD serving cell on the downlink subframe 1 of the current radio frame, its corresponding HARQ-ACK messages are transmitted on the uplink subframe 7 of the current radio frame;

the group 3 corresponds to the downlink subframe 141, the downlink subframe in the group 3 uses the PDSCH HARQ-ACK timing of the uplink and downlink configuration 2/4/5, that is, for the PDSCH transmitted by the FDD serving cell on the downlink subframe 4 of the current radio frame, its corresponding HARQ-ACK messages are transmitted on the uplink subframe 2 of the next radio frame;

the group 4 corresponds to the downlink subframe {7}, the downlink subframe in the group 4 uses the PDSCH HARQ-ACK timing of the uplink and downlink configuration 3/4; that is, for the PDSCH transmitted by the FDD serving cell on the downlink subframe 7 of the current radio frame, its corresponding HARQ-ACK messages are transmitted on the uplink subframe 3 of the next radio frame;

the group 5 corresponds to the downlink subframes {2, 3, 8} and the uplink subframes where the HARQ-ACK messages corresponding to the PDSCH of the downlink subframes in the group 5 are carried are uplink subframes which have an interval of at least three subframes with the downlink subframes in the group 5:

for the PDSCH transmitted by the FDD serving cell on the downlink subframe 2/3 of the current radio frame, its corresponding HARQ-ACK messages are transmitted on the uplink subframe 8 of the current radio frame;

for the PDSCH transmitted by the FDD serving cell on the downlink subframe 8 of the current radio frame, its corresponding HARQ-ACK messages are transmitted on the uplink subframe 3 of the next radio frame.

As can be seen from FIG. 13, the numbers of HARQ-ACK messages fed back on the uplink subframes 2, 3 transmitting the HARQ-ACK messages are 2 respectively, which is very uniform. We can also see from here that, the HARQ-ACK feedback delay of each downlink subframe in the groups 2 to 5 is not the minimum.

Refer to the PDSCH HARQ-ACK timing relationships defined for different uplink and downlink configurations in existing TDD system in Rel-8/9/10, we found that, the Rel-8/9/10 preferentially consider to ensure that the HARQ-ACK messages on the respective uplink subframes feeding back the HARQ-ACK messages in the primary serving cell should be as uniform as possible. Based on this design principle, we can organize the PDSCH HARQ-ACK timing of the downlink subframes of the FDD serving cell that meets the design into the following table, Table 3 is the FDD downlink subframe set K, wherein the meanings of the numbers in the table are the same as the Table 2 in the BACKGROUND.

TABLE 3

| Uplink and downlink configuration of the TDD serving cell | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | — | 5, 4 | — | — | 6, 5, 4 | — | 5, 4 |
| 1 | — | — | 7, 6, 5 | 5, 4 | — | — | — | 7, 6, 5 | 5, 4 | — |
| 2 | — | — | 8, 7, 5, 4, 6 | — | — | — | — | 8, 7, 5, 4, 6 | — | — |
| 3 | — | — | 10, 9, 8, 11 | 8, 7, 6 | 6, 5, 4 | — | — | — | — | — |
| 4 | — | — | 12, 10, 9, 8, 11 | 8, 6, 5, 4, 7 | — | — | — | — | — | — |
| 5 | — | — | 13, 12, 10, 9, 8, 7, 5, 4, 11, 6 | — | — | — | — | — | — | — |
| 6 | — | — | 8, 7 | 6, 7 | 6, 5 | — | — | 7, 6 | 5, 4 | — |

Figure 14:
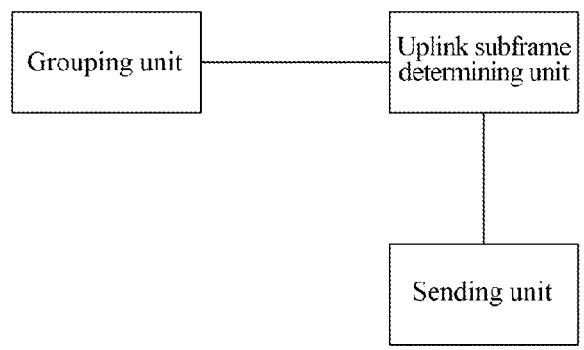
FIG. 14 is a schematic diagram of a device for sending answer information in accordance with the present document.

As shown in FIG. 14, the present embodiment further provides a device for sending answer information, comprising: a grouping unit, an uplink subframe determining unit and a sending unit, wherein:

the grouping unit is configured to: when a frequency division duplex (FDD) and a time division duplex (TDD) aggregate, where a TDD cell works as a primary serving cell and a FDD cell works as a secondary serving cell, group downlink subframes of the FDD secondary serving cell;

the uplink subframe determining unit is configured to: use different hybrid automatic repeat request (HARQ) timing relationships for different downlink subframe groups, determine uplink subframes where the HARQ-ACK messages corresponding to the PDSCH transmitted on the downlink subframe groups are transmitted;

the sending unit is configured to: send the HARQ-ACK messages on the uplink subframes determined by the uplink subframe determining unit.

the uplink subframe determining unit is configured to: determine the uplink subframes where the HARQ-ACK messages corresponding to the PDSCH of the downlink subframe groups are transmitted according to the HARQ timing relationship corresponding to the TDD; or, determine the HARQ-ACK messages corresponding to the PDSCH of the downlink subframe groups transmitted on the uplink subframes which have an interval of at least three subframes with the downlink subframes.

the grouping unit is configured to: group the downlink subframes of the FDD secondary serving cell into different downlink subframe groups according to the uplink and downlink configuration of the primary serving cell participating in the aggregation.

When the TDD primary serving cell participating in the aggregation uses any one of the uplink and downlink configurations 0-6, the downlink subframes of the FDD secondary serving cell are divided into two groups, wherein:

the downlink subframe contained in the group 1 is {2}, the uplink subframes where the HARQ-ACK messages corresponding to the PDSCH of the downlink subframe in group 1 are transmitted are carried are uplink subframes which have an interval of at least three subframes with the downlink subframe in the group 1;

the downlink subframes contained in the group 2 are {0, 1, 3, 4, 5, 6, 7, 8, 9}, determine the uplink subframes where the HARQ-ACK messages corresponding to the PDSCH of the group 2 are transmitted according to the HARQ timing relationship corresponding to the uplink and downlink configuration 5 of the TDD.

When the TDD primary serving cell participating in the aggregation uses the uplink and downlink configuration 0, the downlink subframes of the FDD secondary serving cell are divided into three groups, wherein:

the group 1 comprises downlink subframes with the same subframe numbers as the downlink subframe of the primary serving cell, determine the uplink subframe where the HARQ-ACK messages corresponding to the PDSCH of the group 1 are transmitted according to the HARQ timing relationship corresponding to the uplink and downlink configuration 0 of the TDD.

the downlink subframes contained in the group 2 are {3, 8}, determine the uplink subframes where the HARQ-ACK messages corresponding to the PDSCH of the group 2 are transmitted according to the HARQ timing relationship corresponding to the uplink and downlink configuration 2 of the TDD;

the downlink subframes contained in the group 3 are {2, 4, 7, 9}, the uplink subframes where the HARQ-ACK messages corresponding to the PDSCH of the downlink subframe in the group 3 are transmitted are uplink subframes which have an interval of at least three subframes with the downlink subframes in the group 3.

When the TDD primary serving cell participating in the aggregation uses the uplink and downlink configuration 1, the downlink subframes of the FDD secondary serving cell are divided into two groups, wherein:

the group 1 comprises the downlink subframes with the same subframe numbers as the downlink subframes of the primary serving cell, determine the uplink subframes where the HARQ-ACK messages corresponding to the PDSCH of the group 1 are transmitted according to the HARQ timing relationship corresponding to the uplink and downlink configuration 1 of the TDD;

the downlink subframes contained in the group 2 are {2, 3, 7, 8}, the uplink subframes where the HARQ-ACK messages corresponding to the PDSCH of the downlink subframe in the group 2 are transmitted are uplink subframes which have an interval of at least three subframes with the downlink subframes in the group 2.

When the TDD primary serving cell participating in the aggregation uses the uplink and downlink configuration 2, the downlink subframes of the FDD secondary serving cell are divided into two groups, wherein:

the group 1 comprises the downlink subframes with the same subframe numbers as the downlink subframes of the primary serving cell, determine the uplink subframes where the HARQ-ACK messages corresponding to the PDSCH of the group 1 are transmitted according to the HARQ timing relationship corresponding to the uplink and downlink configuration 2 of the TDD;

the downlink subframes contained in the group 2 are {2, 7}, the uplink subframes where the HARQ-ACK messages corresponding to the PDSCH of the downlink subframes in the group 2 are uplink subframes which have an interval of at least three subframes with the downlink subframes in the group 2.

When the TDD primary serving cell participating in the aggregation uses the uplink and downlink configuration 3, the downlink subframes in the FDD secondary serving cell are divided into three groups, wherein:

the group 1 comprises the downlink subframes with the same subframe numbers as the downlink subframes of the primary serving cell, determine the uplink subframes where the HARQ-ACK messages corresponding to the PDSCH of the group 1 are transmitted according to the HARQ timing relationship corresponding to the uplink and downlink configuration 3 of the TDD;

the downlink subframes contained in the group 2 are {3, 4}, determine the uplink subframes where the HARQ-ACK messages corresponding to the PDSCH of the group 2 are transmitted according to the HARQ timing relationship corresponding to the uplink and downlink configuration 5 of the TDD;

the downlink subframe contained in the group 3 is {2} and the uplink subframes where the HARQ-ACK messages corresponding to the PDSCH of the downlink subframe in the group 3 are uplink subframes which have at least an interval of three subframes with the downlink subframe in the group 3.

When the TDD primary serving cell participating in the aggregation uses the uplink and downlink configuration 3, the downlink subframes in the FDD secondary serving cell are divided into three groups, wherein:

the group 1 comprises part of the downlink subframes with the same subframe numbers as the downlink subframes of the primary serving cell, determine the uplink subframes where the HARQ-ACK messages corresponding to the PDSCH of the group 1 are transmitted according to the HARQ timing relationship corresponding to the uplink and downlink configuration 3 of the TDD;

the downlink subframes contained in the group 2 are {3, 4}, determine the uplink subframes where the HARQ-ACK messages corresponding to the PDSCH of the group 2 are transmitted according to the HARQ timing relationship corresponding to the uplink and downlink configuration 5 of the TDD;

the downlink subframes contained in the group 3 are {2} and the downlink subframes with the same subframe numbers as the downlink subframes of the primary serving cell except of the part in the group 1, the uplink subframes where the HARQ-ACK messages corresponding to the PDSCH of the downlink subframe in the group 3 are uplink subframes which have an interval of at least three subframes with the downlink subframe in the group 3.

When the TDD primary serving cell participating in the aggregation uses the uplink and downlink configuration 4, the downlink subframes of the FDD secondary serving cell are divided into three groups, wherein:

the group 1 comprises the downlink subframes with the same subframe numbers as the downlink subframes of the primary serving cell, determine the uplink subframes where the HARQ-ACK messages corresponding to the PDSCH of the group 1 are transmitted according to the HARQ timing relationship corresponding to the uplink and downlink configuration 4 of the TDD;

the downlink subframe contained in the group 2 is {3}, determine the uplink subframes where the HARQ-ACK messages corresponding to the PDSCH of the group 2 are transmitted according to the HARQ timing relationship corresponding to the uplink and downlink configuration 5 of the TDD;

the downlink subframe contained in the group 3 is {2}, the uplink subframes where the HARQ-ACK messages corresponding to the PDSCH of the downlink subframe in the group 3 are uplink subframes which have an interval of at least three sub-frames with the downlink subframe in the group 3.

When the TDD primary serving cell participating in the aggregation uses the uplink and downlink configuration 4, the downlink subframes of the FDD secondary serving cell are divided into three groups, wherein:

the group 1 comprises part of the downlink subframes with the same subframe numbers as the downlink subframes of the primary serving cell, determine the uplink subframes where the HARQ-ACK messages corresponding to the PDSCH of the group 1 are transmitted according to the HARQ timing relationship corresponding to the uplink and downlink configuration 4 of the TDD;

the downlink subframe contained in the group 2 is {3}, determine the uplink subframes where the HARQ-ACK messages corresponding to the PDSCH of the group 2 are transmitted according to the HARQ timing relationship corresponding to the uplink and downlink configuration 5 of the TDD;

the downlink subframes contained in the group 3 are {2} and downlink subframes with the same subframe numbers as the downlink subframes of the primary serving cell except of the part in the group, the uplink subframes where the HARQ-ACK messages corresponding to the PDSCH of the downlink subframe in the group 3 are uplink subframes which have an interval of at least three sub-frames with the downlink subframes in the group 3.

When the TDD primary serving cell participating in the aggregation uses the uplink and downlink configuration 5, the downlink subframes of the FDD secondary serving cell are divided into two groups, wherein:

the group 1 comprises the downlink subframes with the same subframe numbers as the downlink subframes of the primary serving cell, determine the uplink subframes where the HARQ-ACK messages corresponding to the PDSCH of the group 1 are transmitted according to the HARQ timing relationship corresponding to the uplink and downlink configuration 5 of the TDD;

the downlink subframe contained in the group 2 is {2}, the uplink subframes where the HARQ-ACK messages corresponding to the PDSCH of the downlink subframe in group 2 are transmitted are uplink subframes which have an interval of at least three sub-frames with the downlink subframe in the group 2.

When the TDD primary serving cell participating in the aggregation uses the uplink and downlink configuration 6, the downlink subframes of the FDD secondary serving cell are divided into three groups, wherein:
the group 1 comprises the downlink subframes with the same subframe numbers as the downlink subframes of the primary serving cell, determine the uplink subframes where the HARQ-ACK messages corresponding to the PDSCH of the group 1 are carried according to the HARQ timing relationship corresponding to the uplink and downlink configuration 6 of the TDD;
the downlink subframe contained in the group 2 is {4}, determine the uplink subframes where the HARQ-ACK messages corresponding to the PDSCH of the group 2 are transmitted according to the HARQ timing relationship corresponding to the uplink and downlink configuration 1 of the TDD;
the group 3 comprises the downlink sub-frames {2, 3, 7, 8} and the uplink subframes where the HARQ-ACK messages corresponding to the PDSCH of the downlink subframes in group 3 are transmitted are uplink subframes which have an interval of at least three subframes with the downlink subframes in the group 3.

When the TDD primary serving cell participating in the aggregation uses the uplink and downlink configuration 6, the downlink subframes of the FDD secondary serving cell are divided into five groups, wherein:
the group 1 comprises part of the downlink subframes with the same subframe numbers as the downlink subframes of the primary serving cell, determine the uplink subframes where the HARQ-ACK messages corresponding to the PDSCH of the group 1 are transmitted according to the HARQ timing relationship corresponding to the uplink and downlink configuration 6 of the TDD;
the downlink subframe contained in the group 2 is {1}, determine the uplink subframes where the HARQ-ACK messages corresponding to the PDSCH of the group 2 are transmitted according to the HARQ timing relationship corresponding to the uplink and downlink configuration 0, 1 or 2 of the TDD;
the downlink subframe contained in the group 3 is {4}, determine the uplink subframes where the HARQ-ACK messages corresponding to the PDSCH of the group 3 are transmitted according to the HARQ timing relationship corresponding to the uplink and downlink configuration 2, 4 or 5 of the TDD;
the downlink subframe contained in the group 4 is {7}, determine the uplink subframes where the HARQ-ACK messages corresponding to the PDSCH of the group 4 are transmitted according to the HARQ timing relationship corresponding to the uplink and downlink configuration 3 or 4 of the TDD;
the downlink subframes contained in the group 5 are { 2, 3, 8}, the uplink subframes where the HARQ-ACK messages corresponding to the PDSCH of the downlink subframes in the group 5 are uplink subframes which have an interval of at least three subframes with the downlink subframes in the group 5.

The above description is only embodiments of the present document and not used to limit the present document, for a person skilled in the art, the present document may have various changes and variations. Any modifications, equivalent replacements, or improvements made within the spirit and principles of the present document should be included within the scope of the claims of the present document. For example, the system applied in the present document is not limited to the LTE system.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

INDUSTRIAL APPLICABILITY

The embodiment of the present document can ensure reusing existing downlink timing relationships as much as possible, and need very little of extra standardization work; meanwhile, it is also able to ensure that the HARQ-ACK messages on the uplink subframe feeding back the HARQ-ACK messages are distributed uniformly as much as possible, and also ensure that the HARQ-ACK feedback delay is as small as possible.

What is claimed is:
1. A method for sending answer information, comprising:
when a frequency division duplex (FDD) and a time division duplex (TDD) aggregate, where a TDD cell works as a primary serving cell and a FDD cell works as a secondary serving cell, a user equipment (UE) grouping downlink subframes of a FDD secondary serving cell, and using different hybrid automatic repeat request (HARQ) timing relationships for different downlink subframe groups, determining uplink subframes where HARQ-ACK acknowledgment messages corresponding to physical downlink shared channels (PDSCH) transmitted on respective downlink subframe groups are carried, and transmitting the HARQ-ACK messages on the determined uplink subframes;
wherein, said grouping the downlink subframes of the FDD secondary serving cell comprises: grouping the downlink subframes of the FDD secondary serving cell according to an uplink and downlink configuration of the primary serving cell participating in the aggregation;
wherein, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprises:
when the TDD primary serving cell participating in the aggregation uses the uplink and downlink configuration 3, dividing the downlink subframes of the FDD secondary serving cell into three groups, wherein:
the group 1 comprises downlink subframes having the same subframe numbers as the downlink subframes of the primary serving cell, the uplink subframes where the HARQ-ACK messages corresponding to the PDSCH of the group 1 are carried are determined according to the HARQ timing relationship corresponding to the uplink and downlink configuration 3 of the TDD;

the downlink subframes contained in the group 2 are {3,4}, the uplink subframes where the HARQ-ACK messages corresponding to the PDSCH of the group 2 are located are determined according to the HARQ timing relationship corresponding to the uplink and downlink configuration 5 of the TDD;

the downlink subframe contained in the group 3 is {2}, and the uplink subframes where the HARQ-ACK messages corresponding to the PDSCH of the downlink subframe in the group 3 are carried are uplink subframes which has an interval of at least three subframes with the downlink subframe in the group 3; or when the TDD primary serving cell participating in the aggregation uses the uplink and downlink configuration 4, dividing the downlink subframes of the FDD secondary serving cell into three groups, wherein:

the group 1 comprises downlink subframes having the same subframe numbers as the downlink subframes of the primary serving cell, the uplink subframes where the HARQ-ACK messages corresponding to the PDSCH of the group 1 are carried are determined according to the HARQ timing relationship corresponding to the uplink and downlink configuration 4 of the TDD;

the downlink subframe contained in the group 2 is {3}, the uplink subframes where the HARQ-ACK messages corresponding to the PDSCH of the group 2 are carried are determined according to the HARQ timing relationship corresponding to the uplink and downlink configuration 5 of the TDD;

the downlink subframe contained in the group 3 is {2}, the uplink subframes where the HARQ-ACK messages corresponding to the PDSCH of the downlink subframe in the group 3 are carried are uplink subframes which have an interval of at least three subframes with the downlink subframe in the group 3.

2. The method of claim 1, wherein, grouping the downlink subframes of the FDD secondary serving cell according to the uplink and downlink configuration of the primary serving cell participating in the aggregation, and determining the uplink subframes where HARQ-ACK acknowledgment messages corresponding to the PDSCH transmitted on respective downlink subframe groups are carried comprises:

when the TDD primary serving cell participating in the aggregation uses any one of uplink and downlink configurations 0-6, dividing the downlink subframes of the FDD secondary serving cell into two groups, wherein:

the downlink subframe contained in group 1 is {2}, the uplink subframe where the HARQ-ACK messages corresponding to the PDSCH of the downlink subframe in the group 1 are carried is an uplink subframe which has an interval of at least three subframes with the downlink subframe in the group 1;

the downlink subframes contained in group 2 are {0,1,3,4,5,6,7,8,9}, the uplink subframes, where the HARQ-ACK messages corresponding to the PDSCH of the group 2 are carried, are determined according to the HARQ timing relationship corresponding to uplink and downlink configuration 5 of the TDD.

3. The method of claim 1, wherein, grouping the downlink subframes of the FDD secondary serving cell according to the uplink and downlink configuration of the primary serving cell participating in the aggregation, and determining uplink subframes where the HARQ-ACK acknowledgment messages corresponding to the PDSCH transmitted on respective downlink subframe groups are carried comprises:

when the TDD primary serving cell participating in the aggregation uses the uplink and downlink configuration 0, dividing the downlink subframes of the FDD secondary serving cell into three groups, wherein:

the group 1 comprises downlink subframes having same subframe numbers as the downlink subframes of the primary serving cell, the uplink subframes, where the HARQ-ACK messages corresponding to the PDSCH of the group 1 are carried, are determined according to a HARQ timing relationship corresponding to the uplink and downlink configuration 0 of the TDD;

the downlink subframes contained in the group 2 are {3,8}, the uplink subframes, where the HARQ-ACK messages corresponding to the PDSCH of the group 2 are carried, are determined according to the HARQ timing relationship corresponding to the uplink and downlink configuration 2 of the TDD;

the downlink subframes contained in group 3 are {2,4,7,9}, the uplink subframes, where the HARQ-ACK messages corresponding to the PDSCH of the downlink subframes in the group 3 are carried, are uplink subframes which have an interval of at least three subframes with the downlink subframes in the group 3.

4. The method of claim 1, wherein, grouping the downlink subframes of the FDD secondary serving cell according to the uplink and downlink configuration of the primary serving cell participating in the aggregation, and determining the uplink subframes where the HARQ-ACK acknowledgment messages corresponding to the physical downlink shared channel (PDSCH) transmitted on respective downlink subframe groups are carried are determined comprises:

when the TDD primary serving cell participating in the aggregation uses the uplink and downlink configuration 1, dividing downlink subframes of the FDD secondary serving cell into two groups, wherein:

the group 1 comprises downlink subframes with the same subframe numbers as the downlink subframes of the primary serving cell, the uplink subframes, where the HARQ-ACK messages corresponding to the PDSCH of the group 1 are carried, are determined according to the HARQ timing relationship corresponding to the uplink and downlink configuration 1 of the TDD;

the downlink subframes contained in the group 2 are {2,3,7,8}, the uplink subframes where the HARQ-ACK messages corresponding to the PDSCH of the downlink subframes in the group 2 are carried are uplink subframes which have an interval of at least three subframes with the downlink subframes in the group 2.

5. The method of claim 1, wherein, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on the respective downlink subframe groups are carried comprises:

when the TDD primary serving cell participating in the aggregation uses the uplink and downlink configuration 2, dividing the downlink subframes of the FDD secondary serving cell into two groups, wherein:

the group 1 comprises downlink subframes having the same subframe numbers as the downlink subframes of the primary serving cell, the uplink subframes, where the HARQ-ACK messages corresponding to the PDSCH of the group 1 are carried, are determined according to the HARQ timing relationship corresponding to the uplink and downlink configuration 2 of the TDD;

the downlink subframes contained in the group 2 are {2,7}, the uplink subframes where the HARQ-ACK messages corresponding to the PDSCH of the downlink subframes in the group 2 are uplink subframes which have an interval of at least three subframes with the downlink subframes in the group 2;

preferably, the HARQ-ACK messages corresponding to PDSCH of downlink subframes {0,1,2,3} are carried on uplink subframe #7 of a current radio frame, the HARQ-ACK messages corresponding to PDSCH of downlink subframes {4,5,6,7,8} are carried on uplink subframe #2 of next radio frame and the HARQ-ACK messages corresponding to PDSCH of downlink subframe {9} are carried on uplink subframe #7 of the next radio frame.

6. The method of claim 1, when the TDD primary serving cell participating in the aggregation uses the uplink and downlink configuration 3, the HARQ-ACK messages corresponding to PDSCH of downlink subframes #0 is carried on uplink subframe #4 of a current radio frame, the HARQ-ACK messages corresponding to PDSCH of downlink subframes {1,2,3,4,5,6} are carried on uplink subframe #2 of next radio frame, the HARQ-ACK messages corresponding to PDSCH of downlink subframes {7,8} are carried on uplink subframe #3 of the next radio frame and the HARQ-ACK messages corresponding to PDSCH of downlink subframe #9 are carried on uplink subframe #4 of the next radio frame.

7. The method of claim 1, wherein, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprises:

when the TDD primary serving cell participating in the aggregation uses the uplink and downlink configuration 3, dividing the downlink subframes of the FDD secondary serving cell into three groups, wherein:

the group 1 comprises a part of the downlink subframes having the same subframe numbers as the downlink subframes of the primary serving cell, the uplink subframes where the HARQ-ACK messages corresponding to the PDSCH of the group 1 are carried are determined according to the HARQ timing relationship corresponding to the uplink and downlink configuration 3 of the TDD;

the downlink subframes contained in the group 2 are {3,4}, the uplink subframes where the HARQ-ACK messages corresponding to the PDSCH of the group 2 are carried are determined according to the HARQ timing relationship corresponding to the uplink and downlink configuration 5 of the TDD;

the downlink subframes contained in the group 3 are {2} and the downlink subframes having the same subframe numbers as the downlink frames of the primary serving cell except of the part in the group 1, and the uplink subframes where the HARQ-ACK messages corresponding to the PDSCH of the downlink subframes in the group 3 are carried are uplink subframes which have an interval of at least three subframes with the downlink subframes in the group 3.

8. The method of claim 1, wherein, when the TDD primary serving cell participating in the aggregation uses the uplink and downlink configuration 4, the HARQ-ACK messages corresponding to PDSCH of downlink subframes {0,1,2,3,4,5} are carried on uplink subframe #3 of next radio frame and the HARQ-ACK messages corresponding to PDSCH of downlink subframes {6,7,8,9} are carried on uplink subframe #2 of the next radio frame.

9. The method of claim 1, wherein, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprises:

when the TDD primary serving cell participating in the aggregation uses the uplink and downlink configuration 4, dividing the downlink subframes of the FDD secondary serving cell into three groups, wherein:

the group 1 comprises part of the downlink subframes having the same subframe numbers as the downlink subframes of the primary serving cell, the uplink subframes where the HARQ-ACK messages corresponding to the PDSCH of the group 1 are carried are determined according to the HARQ timing relationship corresponding to the uplink and downlink configuration 4 of the TDD;

the downlink subframe contained in the group 2 is {3}, the uplink subframes where the HARQ-ACK messages corresponding to the PDSCH of the group 2 are carried are determined according to the HARQ timing relationship corresponding to the uplink and downlink configuration 5 of the TDD;

the downlink subframes contained in the group 3 are {2} and the downlink subframes having the same subframe numbers as the downlink subframes of the primary serving cell except of the part in the group 1, the uplink subframes where the HARQ-ACK messages corresponding to the PDSCH of the downlink subframes in the group 3 are uplink subframes which have an interval of at least three subframes with the downlink subframes in the group 3.

10. The method of claim 1, wherein, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprises:

when the TDD primary serving cell participating in the aggregation uses the uplink and downlink configuration 5, dividing the downlink subframes of the FDD secondary serving cell into two groups, wherein:

the group 1 comprises downlink subframes having the same subframe numbers as the downlink subframes of the primary serving cell, the uplink subframes where the HARQ-ACK messages corresponding to the PDSCH of the group 1 are carried are determined according to the HARQ timing relationship corresponding to the uplink and downlink configuration 5 of the TDD;

the downlink subframe contained in the group 2 is {2}, the uplink subframes where the HARQ-ACK messages corresponding to the PDSCH of the downlink subframes in the group 2 are uplink subframes which have an interval of at least three subframes with the downlink subframe in the group 2;
preferably, the HARQ-ACK messages corresponding to PDSCH of downlink subframes {0,1,2,3,4,5,6,7,8} are carried on uplink subframe #2 of next radio frame and the HARQ-ACK messages corresponding to the PDSCH of downlink subframe #9 are carried on uplink subframe #2 of the next two radio frames.

11. The method of claim 1, wherein, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprises:
when the TDD primary serving cell participating in the aggregation uses the uplink and downlink configuration 6, dividing the downlink subframes of the FDD secondary serving cell into three groups, wherein:
the group 1 comprises downlink subframes having the same subframe numbers as the downlink subframes of the primary serving cell, the uplink subframes where the HARQ-ACK messages corresponding to the PDSCH of the group 1 are carried are determined according to the HARQ timing relationship corresponding to the uplink and downlink configuration 6 of the TDD;
the downlink subframe contained in the group 2 is {4}, the uplink subframes where the HARQ-ACK messages corresponding to the PDSCH of the group 2 are carried are determined according to the HARQ timing relationship corresponding to the uplink and downlink configuration 1 of the TDD;
the downlink subframes contained in the group 3 are {2,3,7,8} and the uplink subframes where the HARQ-ACK messages corresponding to the PDSCH of the downlink subframes in the group 3 are carried are uplink subframes which have an interval of at least three subframes with the downlink subframes in the group 3.

12. The method of claim 1, wherein, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprises:
when the TDD primary serving cell participating in the aggregation uses the uplink and downlink configuration 6, dividing the downlink subframes of the FDD secondary serving cell into five groups, wherein:
the group 1 comprises part of the downlink subframes having the same subframe numbers as the downlink subframes of the primary serving cell, the uplink subframes where the HARQ-ACK messages corresponding to the PDSCH of the group 1 are carried are determined according to the HARQ timing relationship corresponding to the uplink and downlink configuration 6 of the TDD;
the downlink subframe contained in the group 2 is {1}, the uplink subframes where the HARQ-ACK messages corresponding to the PDSCH of the group 2 are carried are determined according to the HARQ timing relationship corresponding to the uplink and downlink configuration 0, 1 or 2 of the TDD;
the downlink subframe contained in the group 3 is {4}, the uplink subframes where the HARQ-ACK messages corresponding to the PDSCH of the group 3 are carried are determined according to the HARQ timing relationship corresponding to the uplink and downlink configuration 2, 4 or 5 of the TDD;
the downlink subframe contained in the group 4 is {7}, the uplink subframes where the HARQ-ACK messages corresponding to the PDSCH of the group 4 are carried are determined according to the HARQ timing relationship corresponding to the uplink and downlink configuration 3 or 4 of the TDD;
the downlink subframes contained in the group 5 are {2,3,8}, the uplink subframes where the HARQ-ACK messages corresponding to the PDSCH of the downlink subframes in the group 5 are carried are uplink subframes which have an interval of at least three subframes with the downlink subframes in the group 5.

13. A device for sending answer information, comprising hardware performing instructions stored in a non-transitory computer readable medium which executes steps in following units: a grouping unit, an uplink subframe determining unit and a sending unit, wherein:
the grouping unit is configured to: when a frequency division duplex (FDD) and a time division duplex (TDD) aggregate, where a TDD cell works as a primary serving cell and a FDD cell works as a secondary serving cell, group downlink subframes of a FDD secondary serving cell;
the uplink subframe determining unit is configured to: respectively use different hybrid automatic repeat request (HARQ) timing relationships for different downlink subframe groups, determine uplink subframes where the HARQ-ACK acknowledgment messages corresponding to the PDSCH transmitted on the downlink subframe groups are carried;
the sending unit is configured to: send the HARQ-ACK messages on the uplink subframes determined by the uplink subframe determining unit;
wherein the grouping unit is configured to: group the downlink subframes of the FDD secondary serving cell according to the uplink and downlink configuration of the primary serving cell participating in the aggregation;
wherein, grouping the downlink subframes of the FDD secondary serving cell according to the uplink and downlink configuration of the primary serving cell participating in the aggregation, and determining the uplink subframes where the HARQ-ACK acknowledgment messages corresponding to the PDSCH transmitted on respective downlink subframe groups are carried comprises:
when the TDD primary serving cell participating in the aggregation uses the uplink and downlink configuration 3, dividing the downlink subframes of the FDD secondary serving cell into three groups, wherein:
the group 1 comprises downlink subframes having the same subframe numbers as the downlink subframes of the primary serving cell, the uplink subframes where the HARQ-ACK messages corresponding to the PDSCH of the group 1 are carried are determined according to the HARQ timing relationship corresponding to the uplink and downlink configuration 3 of the TDD;
the downlink subframes contained in the group 2 are {3,4}, the uplink subframes where the HARQ-ACK messages corresponding to the PDSCH of the group 2 are located are determined according to the HARQ timing relationship corresponding to the uplink and downlink configuration 5 of the TDD;

the downlink subframe contained in the group 3 is {2}, and the uplink subframes where the HARQ-ACK messages corresponding to the PDSCH of the downlink subframe in the group 3 are carried are uplink subframes which has an interval of at least three subframes with the downlink subframe in the group 3; or when the TDD primary serving cell participating in the aggregation uses the uplink and downlink configuration 4, dividing the downlink subframes of the FDD secondary serving cell into three groups, wherein:

the group 1 comprises downlink subframes having the same subframe numbers as the downlink subframes of the primary serving cell, the uplink subframes where the HARQ-ACK messages corresponding to the PDSCH of the group 1 are carried are determined according to the HARQ timing relationship corresponding to the uplink and downlink configuration 4 of the TDD;

the downlink subframe contained in the group 2 is {3}, the uplink subframes where the HARQ-ACK messages corresponding to the PDSCH of the group 2 are carried are determined according to the HARQ timing relationship corresponding to the uplink and downlink configuration 5 of the TDD;

the downlink subframe contained in the group 3 is {2}, the uplink subframes where the HARQ-ACK messages corresponding to the PDSCH of the downlink subframe in the group 3 are carried are uplink subframes which have an interval of at least three subframes with the downlink subframe in the group 3.

* * * * *